United States Patent
Liu et al.

(10) Patent No.: US 10,975,260 B2
(45) Date of Patent: Apr. 13, 2021

(54) MONOMERS, POLYMERS AND COATING FORMULATIONS THAT COMPRISE AT LEAST ONE N-HALAMINE PRECURSOR, A CATIONIC CENTER AND A COATING INCORPORATION GROUP

(71) Applicant: University of Manitoba, Winnipeg (CA)

(72) Inventors: Song Liu, Winnipeg (CA); Rajbir Kaur, Winnipeg (CA); Zachary J. Wolff, Winnipeg (CA); Gurmeet Singh Bindra, Winnipeg (CA)

(73) Assignee: UNIVERSITY OF MANITOBA, Winnipeg (CA)

( * ) Notice: Subject to any disclaimer, the term of this patent is extended or adjusted under 35 U.S.C. 154(b) by 154 days.

(21) Appl. No.: 15/775,816

(22) PCT Filed: Nov. 10, 2016

(86) PCT No.: PCT/CA2016/051311
§ 371 (c)(1),
(2) Date: May 11, 2018

(87) PCT Pub. No.: WO2017/079841
PCT Pub. Date: May 18, 2017

(65) Prior Publication Data
US 2018/0327627 A1    Nov. 15, 2018

Related U.S. Application Data

(60) Provisional application No. 62/393,757, filed on Sep. 13, 2016, provisional application No. 62/362,460, (Continued)

(30) Foreign Application Priority Data

Oct. 14, 2016   (WO) .............. PCT/CA2016/051201

(51) Int. Cl.
*C09D 201/02* (2006.01)
*C09D 201/04* (2006.01)
(Continued)

(52) U.S. Cl.
CPC .......... *C09D 133/24* (2013.01); *C08K 5/3415* (2013.01); *C09D 5/14* (2013.01); *C09D 7/63* (2018.01); *C08K 5/34* (2013.01)

(58) Field of Classification Search
None
See application file for complete search history.

(56) References Cited

U.S. PATENT DOCUMENTS

2019/0151224 A1*   5/2019   Khatun ................ A61K 8/8182

FOREIGN PATENT DOCUMENTS

CA      2618732 A1    10/2007
CA      2741660 A1    5/2010
(Continued)

OTHER PUBLICATIONS

Cerkez et al., Langmuir 2011. 27, 4091-4097.*
(Continued)

*Primary Examiner* — Vu A Nguyen
(74) *Attorney, Agent, or Firm* — Chamberlain, Hrdlicka, White, Williams & Aughtry

(57) ABSTRACT

A modified surface with at least one cationic center and at least one compound. The surface can be modified by various methods. The result of these methods is that the cationic center and the compound are connected to the modified surface. The cationic center and the compound are connected to the modified surface so that both of the cationic center and the compound are available upon the modified surface to react with other chemicals or microorganisms that come into contact with or near to the modified surface. The availability of the cationic center and the compound cause
(Continued)

Click Linkage the modified surface to have a functionality that it would not otherwise have. The number of molecules of the cationic center relative to the number of molecules of the at least one compound may influence the functionality of the modified surface.

7 Claims, 13 Drawing Sheets

Related U.S. Application Data filed on Jul. 14, 2016, provisional application No. 62/287,729, filed on Jan. 27, 2016, provisional application No. 62/255,076, filed on Nov. 13, 2015.

(51) Int. Cl.
*C09D 5/14* (2006.01)
*C09D 133/24* (2006.01)
*C09D 7/63* (2018.01)
*C08K 5/3415* (2006.01)
*C08K 5/34* (2006.01)

(56) References Cited

FOREIGN PATENT DOCUMENTS

| CA | 2869634 A1 * | 11/2013 | ........... C07D 403/14 |
|---|---|---|---|
| CA | 2869634 A1 | 11/2013 | |
| WO | 2006/135406 A2 | 12/2006 | |
| WO | 2008/156636 A1 | 12/2008 | |

OTHER PUBLICATIONS

International Search Report issued in corresponding Application No. PCT/CA2016/051311, dated Dec. 22, 2016 (4 pages).
Written Opinion issued in corresponding Application No. PCT/CA2016/051311, dated Dec. 22, 2016 (6 pages).
Luis J. Bastarrachea et al.; "Antimicrobial Coatings with Dual Cationic and N-Halamine Character: Characterization and Biocidal Efficacy"; Journal of Agricultural and Food Chemistry; vol. 63; pp. 4243-4251; 2015 (9 pages).

* cited by examiner (A)

(B)

(C)

(A)

(B)

MONOMERS, POLYMERS AND COATING FORMULATIONS THAT COMPRISE AT LEAST ONE N-HALAMINE PRECURSOR, A CATIONIC CENTER AND A COATING INCORPORATION GROUP

CROSS-REFERENCE TO RELATED APPLICATIONS

This application claims the benefit of U.S. Provisional Application No. 62/255,076, filed Nov. 13, 2015, and of U.S. Provisional Application No. 62/287,729, filed Jan. 27, 2016, and of U.S. Provisional Application No. 62/362,460, filed Jul. 14, 2016, and of U.S. Provisional Application No. 62/393,757, filed Sep. 13, 2016, and of Patent Cooperation Treaty Patent Application No. PCT/CA2016/051201 filed on Oct. 14, 2016, the entire disclosures of which are incorporated herein by reference.

TECHNICAL FIELD

This disclosure generally relates to compounds having biocidal properties and/or a potential for increased biocidal properties. This disclosure also relates to surfaces that include such a compound and one or more cationic centers, wherein the compound and the cationic centers are attached to the surface by surface modifications, coating formulations or otherwise. In particular, this disclosure relates to modified surfaces that include at least one compound that comprises an N-halamine precursor group. The modified surfaces also include a cationic center, where there is a ratio of cationic centers to N-halamine precursor groups upon the modified surface.

BACKGROUND

Microorganisms, such as bacteria, archaea, yeast or fungi, can cause disease, spoilage of inventory, process inefficiencies, disruptions of healthy natural environments and infrastructure degradation. More specifically, healthcare-associated infections (HAIs) are a serious and growing challenge to health care systems around the world. HAIs cause over 100,000 deaths annually and have become the 3$^{rd}$ leading cause of death in Canada. It is estimated that in any given year, HAIs directly cost the United States healthcare system between about $30B and about $45B. Added to this challenge is the increasing prevalence of microorganisms that are resistant to currently available antimicrobial intervention products and processes, including preventative approaches (disinfectants used to control environmental contamination) and reactive approaches (remedies including the use of antibiotics). Therefore, it is necessary to deploy biocidal technologies in various environments as a strategy for controlling unwanted levels or types of micro-organisms.

A common approach for disinfecting of both hard and soft surfaces is the use of liquid disinfectants. Selection of a suitable disinfectant for any given application is dependent upon the environment where the disinfectant will be applied. Selection criteria include the types of micro-organisms targeted, contact time for the disinfectant, level of toxicity tolerable in each application, cleanliness (or lack thereof) of the surface to be cleaned, sensitivity of the surface materials to oxidization (i.e., leading to corrosion of the substrate), the presence or absence of biofilms, the amount of organic load present on substrate surfaces, and local regulations that may restrict the use of certain active ingredients within a disinfectant. Some environments are far more challenging to adequately disinfect than others.

It is known to modify soft surfaces, such as textiles, to provide biocidal properties. For example, the antimicrobial properties of silver have been known since at least the 1960s. Specifically, silver nanoparticles possess broad-spectrum antimicrobial activities and exhibit few toxicological side effects. Currently there are commercially available textiles that incorporate silver, for example, there is a LULULEMON® (LULULEMON is a registered trademark of Lululemon Athletica Canada Inc.), SILVERSCENT® (SILVERSCENT registered trademark of Lululemon Athletica Inc.) product that incorporates the X-STATIC® (X-STATIC registered trademark of Noble Fiber Technologies, LLC) silver product. Additionally, UNDER ARMOUR® (UNDER ARMOUR registered trademark of Under Armour, Inc.) markets a Scent Control technology that comprises a blend of at least silver and zinc. The biocidal activity of these silver-incorporated textiles is limited by the amount of silver that is present and available to react with micro-organisms. The amount of silver available in a fabric is finite and may decrease as the textiles are laundered.

It is also known to modify textiles that incorporate polyethylene terephthalate (PET). These modifications may be achieved by forming a surface network of polyacrylamide (PAM) and PET, and then converting immobilized amides within the surface network to N-chloramine. Composite fabrics with such surface networks have been termed PAM-PETs. PAM-PETs have been challenged with different strains of multi-drug resistant bacteria including health-care acquired *Staphylococcus aureus*, an MRSA (isolate #70065); community-acquired *S. aureus*, also an MRSA (isolate #70527); multi-drug-resistant (MDR) ESBL *E. coli* (isolate #70094); MDR *Pseudomonas aeruginosa* (isolate #73104); and *S. aureus* ATCC 25923. The PAM-PET composite fabric demonstrated close to a 6-log reduction of all the tested bacteria. Furthermore, the N-chloramine on the PAM-PET was evaluated. After 29 regeneration cycles, the PAM-PET (chlorine 306 ppm) was still able to provide 6-log reduction of HA-MRSA (isolate #70527) within 20 minutes of contact.

International patent application number PCT/CA2013/000491 teaches using forming a semi-interpenetrating network upon a PET surface. The network provides at least one alkynyl group for covalently bonding cyclic amide, azido-5,5-dimethyl-hydantoin (ADMH). This modified PET sample could bring 7-log reductions of both MDR ESBL #70094 and CA-MRSA #70527. PCT/CA/2013/00491 also teaches linking the ADMH molecule with a short-chain QAC to create N-(2-azidoethyl)-3-(4,4-dimethyl-2,5-dioxo-imidazolidin-1-yl)-N,N-dimethylpropan-1-aminium chloride (ADPA) and covalently bonding this molecule onto the PET using the Cu (I)-catalyzed azide-alkyne cyclo addition (CuAAC, commonly termed as "click chemistry").

However, forming the surface semi-interpenetrating network as taught by PCT/CA/-2013/00491, as used in the first step of modification as a priming process, cannot be easily scaled up to industrially relevant levels. For example, the process requires multiple processing steps as well as the introduction of environmentally unfriendly additives, such as a methanol bath at elevated temperature. Additionally, the process requires UV irradiation to promote crosslinking in a methanol-saturated environment, which may cause safety concerns.

SUMMARY

Embodiments of the present disclosure relate to a modified surface that includes at least one cationic center and at least one compound. The surface can be modified by various methods. The result of these methods is that the at least one cationic center and the at least one compound are connected to the modified surface. The at least one cationic center and the at least one compound are connected to the modified surface so that both of the at least one cationic center and the at least one compound are available upon the modified surface to react with other chemicals or microorganisms that may come into contact with or near to the modified surface. The availability of the at least one cationic center and the at least one compound cause the modified surface to have a functionality that it would not otherwise have.

In some embodiments of the present disclosure the number of molecules of the cationic center relative to the number of molecules of the at least one compound may influence the functionality of the modified surface. In other words, the ratio of the number of cationic center molecules to the number of molecules of the at least one compound may influence the functionality of the modified surface.

In some embodiments of the present disclosure the at least one cationic center may comprise a positively charged atom with one or more functional groups that are bound thereto. In some embodiments of the present disclosure the quaternary cationic center may be a quaternary ammonium, a quaternary phosphonium, or a quaternary sulfonium. In other embodiments of the present disclosure the cationic center may be another type of positively charged atom.

In some embodiments of the present disclosure the at least one compound may comprise an N-halamine group or a precursor thereof. When connected to the modified surface, the N-halamine group or the precursor thereof provides biocidal activity or the potential for increased biocidal activity.

In some embodiments of the present disclosure, the at least one cationic center is connected to the modified surface separately from the at least one compound, where the at least one compound comprises at least one N-halamine group or a precursor thereof. In these embodiments of the present disclosure, the at least one cationic center is connected to the modified surface by connecting a cationic compound to the modified surface. The cationic compound is a different compound from the at least one compound.

In some embodiments of the present disclosure, the at least one cationic center is connected to the modified surface together with the at least one compound. In these embodiments of the present disclosure, a single compound is connected to the modified surface, the single compound comprises both an N-halamine precursor group and a cationic center. This single compound is referred to herein as a combined compound.

In some embodiments of the present disclosure, the at least one cationic center is connected to the modified surface both separately from and together with the at least one compound. In these embodiments of the present disclosure, a cationic compound and a combined compound are connected to the modified surface. The cationic compound and the combined compound are different compounds.

Some embodiments of the present disclosure relate to cationic compounds that provide a cationic center but do not include an N-halamine group or an N-halamine precursor group. Some embodiments of the present disclosure relate to cationic compounds with the following general formula [I]:

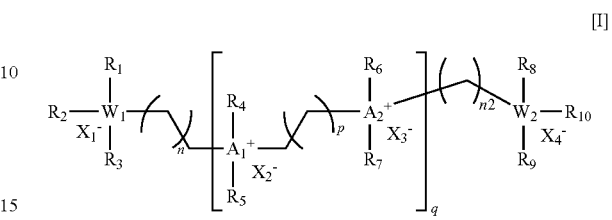

wherein $R_1$, $R_2$ and $R_3$ are each selected from a group consisting of: azide; an alkyne; $CH_3$; $CH_2CH_3$; phenyl; $C_3H_6NH_2$; $CH_3H_5$=$CH_2$; $C_3H_4$≡$CH$; $CH_2CH_2R_{13}$;

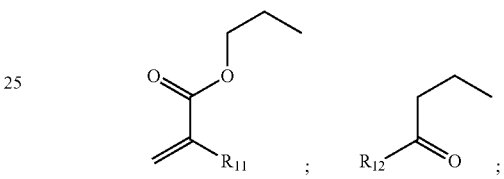

an alcohol; a primary amine; a secondary amine; a tertiary amine; an ether; an epoxide; a carbonyl group; a derivative of a carbonyl group including an acyl, an aldehyde, a ketone, a carboxylic acid, an anhydride, an ester, and an amide; an alkyl halide including a vinyl chloride, a vinyl fluoride; a vinyl group; a derivative of a vinyl group, including a vinyl acetate, a methyl methacrylate, a vinyl-pyridine; a vinyl-benzylidene; an isocyanate group; a carboxyl group and an associated carboxylate ion; a thiol; a phenol group; an imidazole and a combination thereof;

wherein $A_1^+$ and $A_2^+$ are each a cationic center that is independently selected from a group consisting of $N^+$, $P^+$, $S^+$ or nil;

wherein $R_4$, $R_5$, $R_6$ and $R_7$ are independently selected from a group consisting of an alkyl chain of the formula $C_bH_{(2b)}$ where b is an integer between 0 and 20 and a phenyl;

wherein if $A_1^+$ is 5, then at least one of $R_4$ or $R_5$ is nil;

wherein if $A_2^+$ is 5, then at least one of $R_6$ or $R_7$ is nil;

wherein $X_1^-$, $X_2^-$, $X_3^-$, $X_4^-$ are each counter ion that is independently selected from a group consisting of nil, $Cl^-$, $Br^-$, $I^-$ and $F^-$;

wherein n and n2 is an integer selected from 0 to 20;

wherein p is an integer selected from 0 to 20;

wherein q is an integer between 1 and infinity;

wherein only one of $W_1$ and $W_2$ is nil, or both are each independently selected from a group consisting of $P^+$, $N^+$, $S^+$, N, C, benzene, a cycloaliphatic or another moiety that is capable of bonding with 3 or more further moieties, such further moieties including carbon chains or otherwise, when $W_1$ is other than $P^+$, $N^+$, $S^+$ then $X_1^-$ is nil and when $W_2$ is other than $P^+$, $N^+$, $S^+$ then $X_2^-$ is nil;

wherein $R_8$, $R_9$ and $R_{10}$ are each selected from a group consisting of: azide; an alkyne; $CH_3$; $CH_2CH_3$; phenyl; $C_3H_6NH_2$; $CH_3H_5$=$CH_2$; $C_3H_4$≡$CH$; $CH_2CH_2R_{13}$;

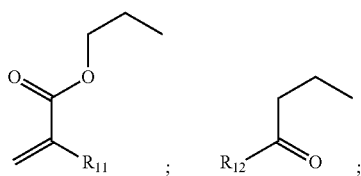

an alcohol; a primary amine; a secondary amine; a tertiary amine; an ether; an epoxide; a carbonyl group; a derivative of a carbonyl group including an acyl, an aldehyde, a ketone, a carboxylic acid, an anhydride, an ester, and an amide; an alkyl halide including a vinyl chloride, a vinyl fluoride; a vinyl group; a derivative of a vinyl group, including a vinyl acetate, a methyl methacrylate, a vinyl-pyridine, a vinyl-benzylidene; an isocyanate group; a carboxyl group and an associated carboxylate ion; a thiol; a phenol group; an imidazole and a combination thereof;

wherein when $W_1$ is $S^+$, at least one of $R_1$, $R_2$ and $R_3$ is nil and the other two moieties together with $S^+$ may form one of

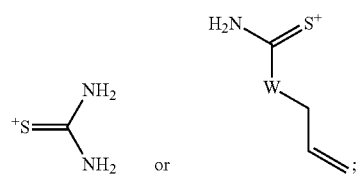

wherein when $W_2$ is $S^+$, at least one of $R_8$, $R_9$ and $R_{10}$ is nil and the other two moieties together with $S^+$ may form one of

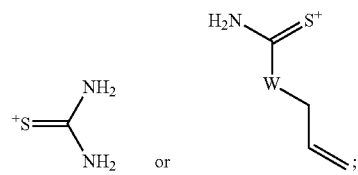

wherein $R_{11}$ is selected from a group consisting of H, $CH_3$ and CN;

wherein $R_{12}$ is selected from a group consisting of H, OH, $NH_2$, $OCH_3$, $OCH_2CH_3$; and wherein $R_{13}$ may be selected from a group consisting of OH, SH, OCN, CN, NC, SNN and NCS.

Some embodiments of the present disclosure relate to cationic compounds with the following general formulas [II] through [VIs]:

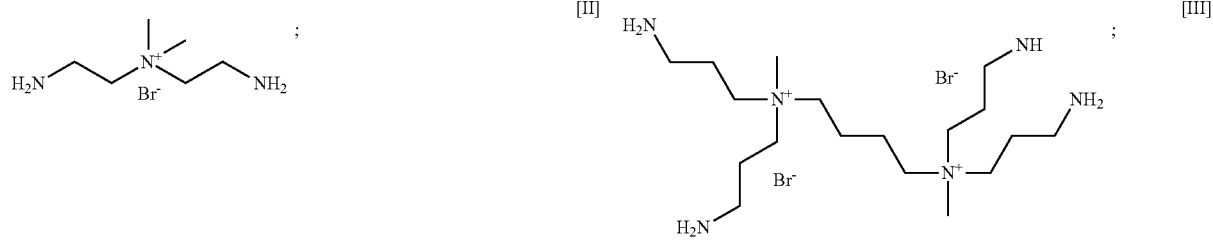

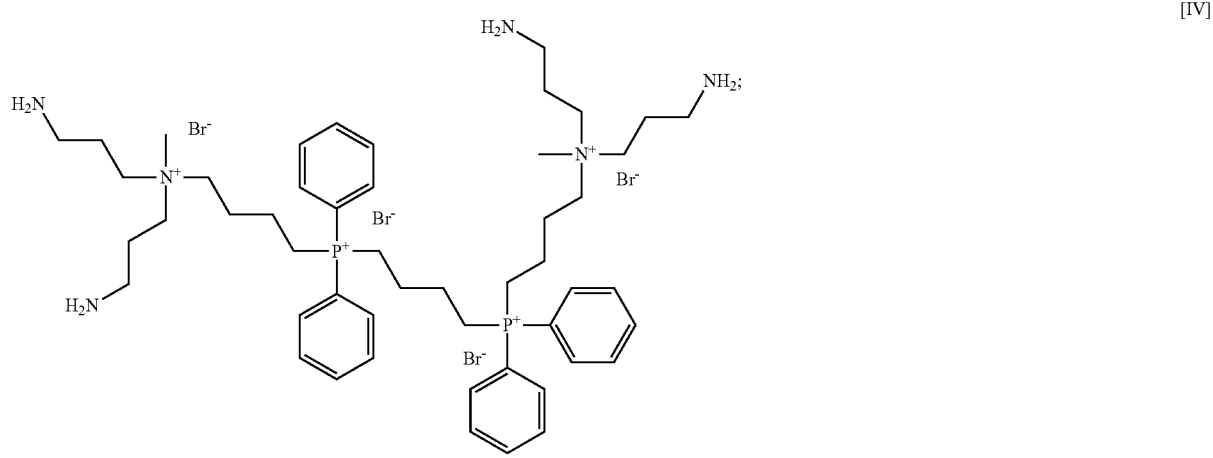

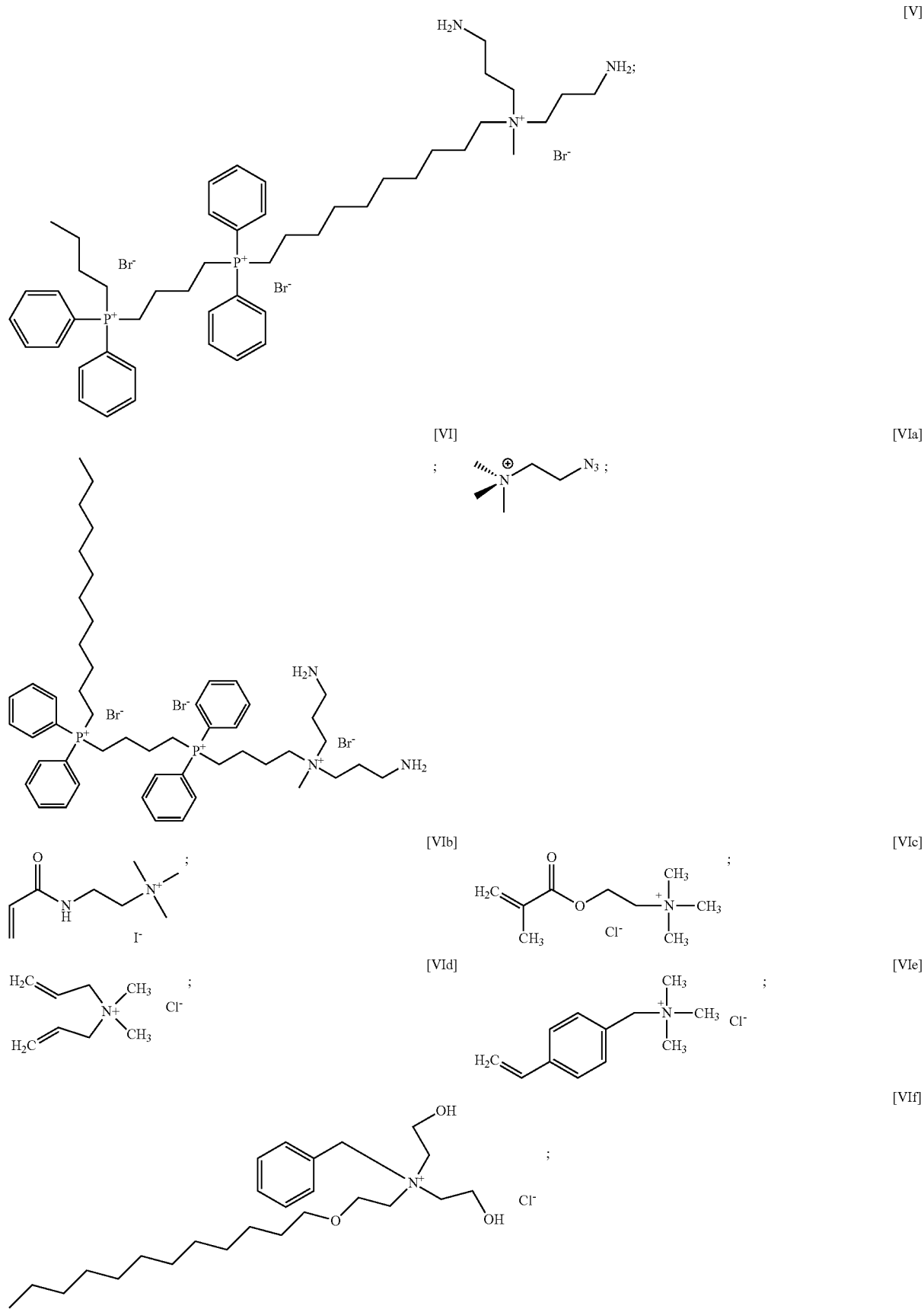

-continued
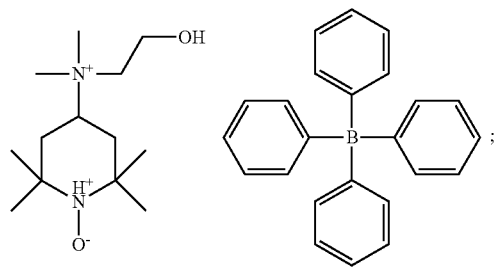 [VIg]
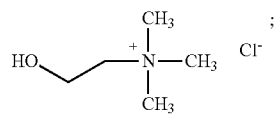 [VIh]
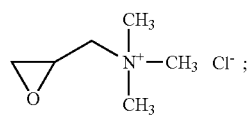 [VII]
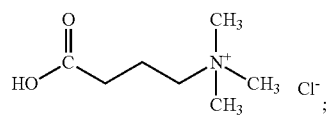 [VIm]
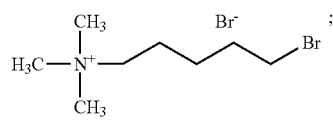 [VIn]
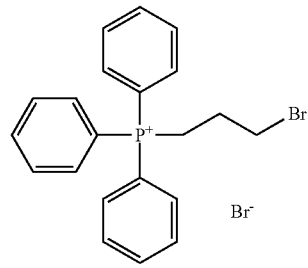 [VIo]
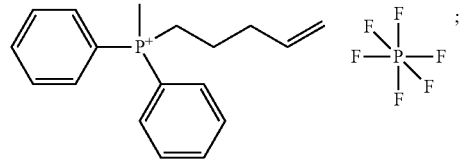 [VIp]
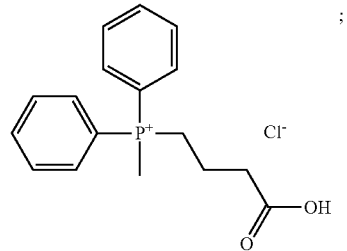 [VIq]
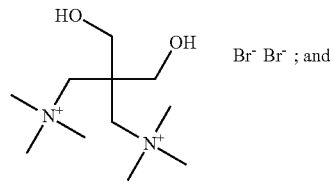 [VIr]
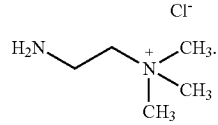 [VIs]

Some embodiments of the present disclosure relate to compounds that comprise at least one N-halamine precursor group. Some embodiments of the present disclosure relate to N-halamine-bearing compounds with the following general formula [VII]:

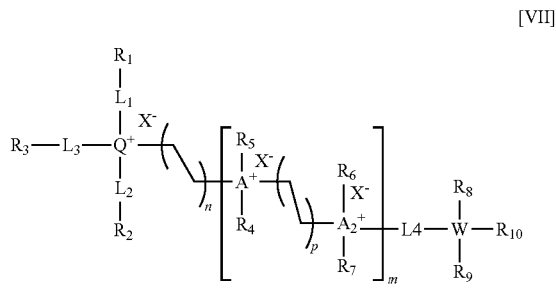

[VII]

wherein $L_1$, $L_2$, $L_3$ and $L_4$ are independently selected from a group comprising: an alkyl chain of the formula $C_bH_{(2b)}$ where b is an integer between 0 and 20; triazyl, an organic linker-group or nil;

wherein the organic linker-group comprises phenyl, propane, butane, pentane, hexane, cyclic propane, cyclic butane, cyclic pentane or cyclic hexane;

wherein at least one of $R_1$, $R_2$ and $R_3$ is an N-halamine precursor that may be selected from a group consisting of imidazolidine-2,4-dione (hydantoin); 5,5-dimethylhydantoin; 4,4-dimethyl-2-oxazalidione; tetramethyl-2-imidazolidione; 2,2,5,5-tetramethylimidazo-lidin-4-one; a uracil derivative; and piperidine or $R_1$, $R_2$ and $R_3$ are independently selected from a group consisting of nil; H; an alkyl chain of the formula $C_bH_{(2b+1)}$ where b is an integer between 0 and 20; a cyclic organic group including ring structures with at least four carbons and an alcohol; a primary amine; a secondary amine; a tertiary amine; an ether; an epoxide; a carbonyl group; a derivative of a carbonyl group including, an acyl, an aldehyde, a ketone, a carboxylic acid, an anhydride, an ester, and an amide; an alkyl halide, including a vinyl chloride, a vinyl fluoride a vinyl group; a derivative of a vinyl group, including a vinyl acetate, a methyl methacrylate, a vinyl-pyridine, a vinyl-benzylidene; an isocyanate group; a carboxyl group and an associated carboxylate ion; a thiol; a phenol group; and an imidazole;

wherein $A1^+$ and $A2^+$ are each a cationic center that is independently selected from a group consisting of $N^+$, $P^+$, $S^+$ or nil;

wherein $R_4$, $R_5$, $R_6$ and $R_7$ are independently selected from a group consisting of an alkyl chain of the formula $C_bH_{(2b)}$ where b is an integer between 0 and 20 and a phenyl wherein if $A^+$ is S, then at least one of $R_4$ or $R_5$ is nil;
wherein if $A_2^+$ is S, then at least one of $R_6$ or $R_7$ is nil;
wherein $X_1^-$, $X_2^-$, $X_3^-$, $X_4^-$ are each a counter ion that is independently selected from a group consisting of nil, $Cl^-$, $Br^-$, $I^-$ and $F^-$;

wherein m is an integer that is either one or two;
wherein n is an integer selected from 0 to 20;
wherein p is an integer selected from 0 to 20;
wherein $W_1$ and $W_2$ are each independently selected from a group consisting of nil, but both not being nil, $P^+$, $N^+$, $S^+$, N, C, benzene, a cycloaliphatic or another moiety that is capable of bonding with 3 or more further moieties, such further moieties including H, carbon chains or otherwise, when $W_1$ is other than $P^+$, $N^+$, $S^+$ then $X_1^-$ is nil and when $W_2$ is other than $P^+$, $N^+$, $S^+$ then $X_2^-$ is nil;

wherein $R_8$, $R_9$ and $R_{10}$ are each selected from a group consisting of: an azide; an alkyne; $CH_3$; $CH_2CH_3$; phenyl; $C_3H_6NH_2$; $CH_3H_5=CH_2$; $C_3H_4\equiv CH$; $CH_2CH_2R_{13}$;

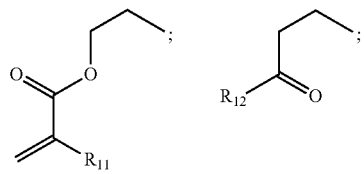

an alcohol; a primary amine; a secondary amine; a tertiary amine; an ether; an epoxide; a carbonyl group; a derivative of a carbonyl group including an acyl, an aldehyde, a ketone, a carboxylic acid, an anhydride, an ester, and an amide; an alkyl halide including a vinyl chloride, a vinyl fluoride; a vinyl group; a derivative of a vinyl group, including a vinyl acetate, a methyl methacrylate, a vinyl-pyridine, a vinyl-benzylidene; an isocyanate group; a carboxyl group and an associated carboxylate ion; a thiol; a phenol group; an imidazole and a combination thereof;

wherein when $W_1$ is $S^+$, at least one of $R_1$, $R_2$ and $R_3$ is nil and the other two moieties together with $S^+$ may form one of

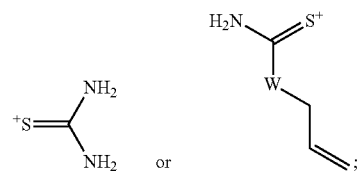

wherein when $W_2$ is $S^+$, at least one of $R_8$, $R_9$ and $R_{10}$ is nil and the other two moieties together with $S^+$ may form one of

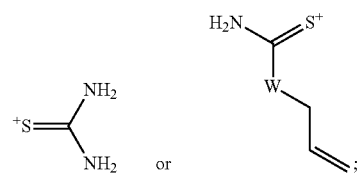

wherein $R_{11}$ is selected from a group consisting of $CH_3$ and CN;

wherein $R_{12}$ is selected from a group consisting of H, OH, $NH_2$, $OCH_3$, $OCH_2CH_3$; and wherein $R_{13}$ may be selected from a group consisting of OH, SH, OCN, CN, NC, SNN and NCS.

Some further embodiments of the present disclosure relate to N-halamine-bearing compounds with one of the following general formulas [VIII] to [XVI]:

[VIII]
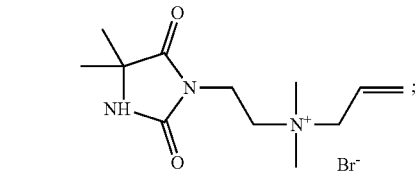

[IX]
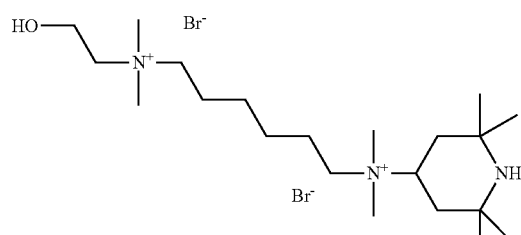

[X]
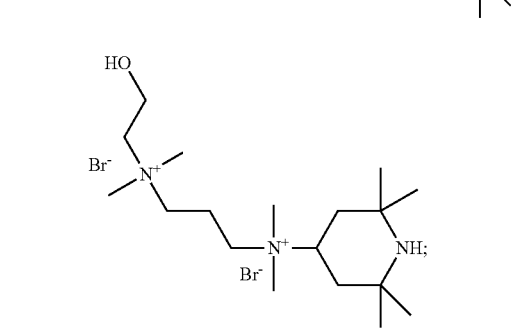

[XI]
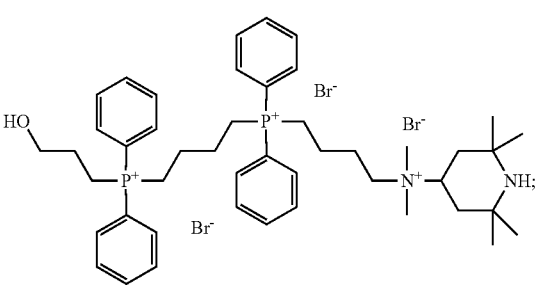

[XII]
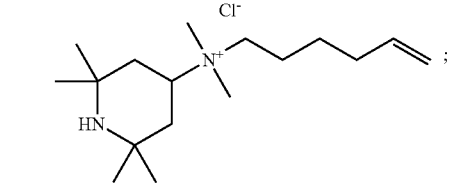

[XIII]
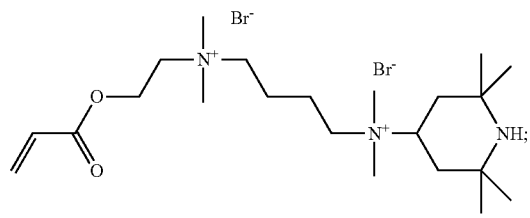

[XIV]
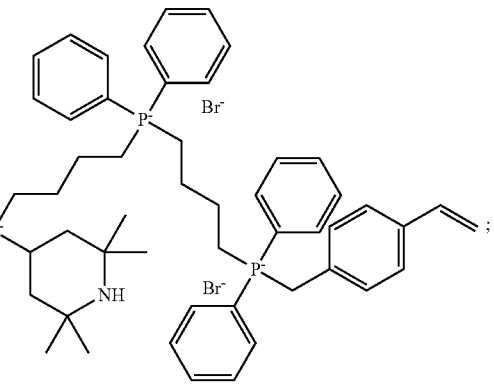

[XV]
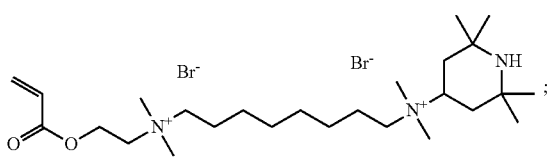

[XVI]
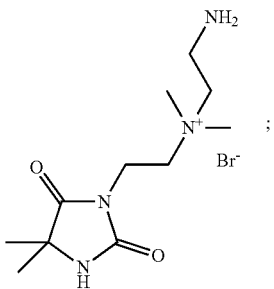

[XVII]
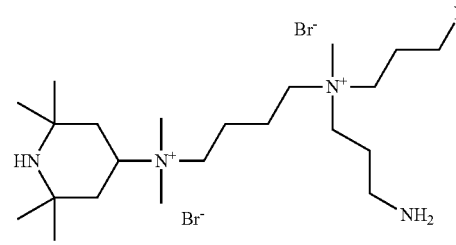

[XVIII]
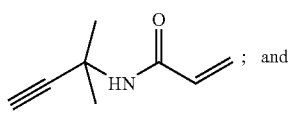

[XIX]
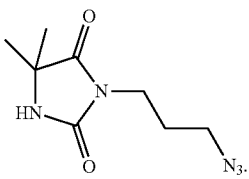

In some embodiments of the present disclosure, a substrate is provided. In some embodiments of the present disclosure the substrate comprises at least one surface that is modified so that at least one cationic center is connected to the modified surface as a cationic compound, which is separate and distinct from a compound that comprises an N-halamine precursor group. In some embodiments of the present disclosure the substrate comprises at least one surface that is modified so that a combined compound is connected to the modified surface, the combined compound that comprises at least one cationic center and at least one N-halamine precursor group. In other embodiments of the present disclosure the substrate comprises at least one surface that is modified so that at least one cationic center is connected to the modified surface as a cationic compound, which is separate and distinct from a combined compound that comprises at least one cationic center and at least one N-halamine precursor group.

Some embodiments of the present disclosure relate to a method for connecting multiple cationic centers and multiple N-halamine precursor groups to a surface in a ratio of a number of connected cationic centers to a number of N-halamine precursor groups is within a range of about 1:1 to about 10:1.

Some embodiments of the present disclosure relate to a coating formulation for coating a substrate, the coating formulation comprising multiple cationic centers and multiple N-halamine precursor groups. A ratio of a number of the multiple cationic centers to a number of N—H binding sites within the multiple N-halamine precursor groups is within a range of about 1:1 and about 10:1.

Some embodiments of the present disclosure relate to a surface comprising multiple cationic centers and multiple N-halamine precursor groups that are both connected to the surface. A ratio of a number of the multiple cationic centers to a number of N—H binding sites within the multiple N-halamine precursor groups is within a range of about 1:1 and about 10:1.

Without being bound by any particular theory, a range of ratios of the number of cationic centers to the number of N-halamine precursor molecules that are present on a modified surface was identified. This range of ratios may provide the modified surface with desirable chlorine-uptake properties. In some embodiments of the present disclosure the desirable chlorine-uptake properties may also provide the modified surface with biocidal activity or the potential for increased biocidal activity. Independent of the chlorine uptake properties, the range of ratios between a number of cationic centers to the number of N-halamine precursor molecules that are present on a modified surface may increase chlorine-mediated biocidal-activity kinetics in comparison to other modified surfaces that do not have cationic centers connected thereto and other modified surfaces that have a ratio of cationic centers to the number of N-halamine precursor molecules outside the range described herein.

BRIEF DESCRIPTION OF THE DRAWINGS

These and other features of this disclosure will become more apparent in the following detailed description in which reference is made to the appended drawings, wherein.

DETAILED DESCRIPTION

Figure 1:
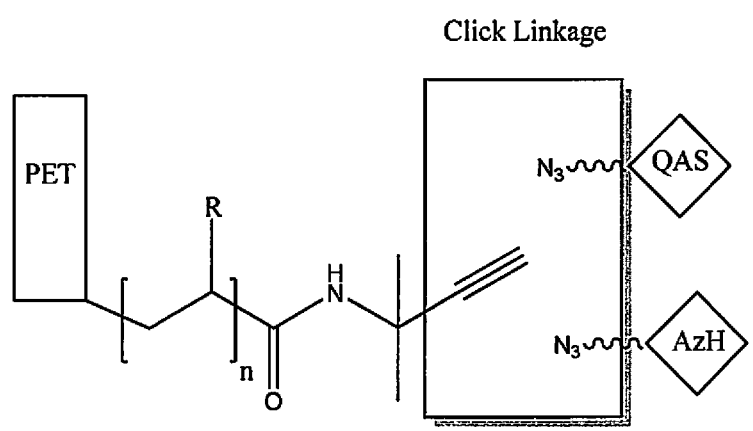
FIG. 1 is a schematic representation of an example of a method for modifying a substrate's surface for connecting at least one cationic center and at least one N-halamine bearing group.

Embodiments of the present disclosure relate to a modified surface that includes at least one cationic center and at least one compound. The surface can be modified by various methods. The result of these methods is that the at least one cationic center and the at least one compound are connected to the modified surface. The at least one cationic center and the at least one compound are connected to the modified surface so that both of the at least one cationic center and the at least one compound are available upon the modified surface to react with other chemicals or microorganisms that may come into contact with or near to the modified surface. The availability of the at least one cationic center and the at least one compound cause the modified surface to have a functionality that it would not otherwise have.

In some embodiments of the present disclosure the number of molecules of the cationic center relative to the number of molecules of the at least one compound may influence the functionality of the modified surface. In other words, the ratio of the number of cationic center molecules to the number of compound molecules may influence the functionality of the modified surface.

In some embodiments of the present disclosure the at least one cationic center may comprise a positively charged atom with one or more functional groups that are bound thereto. In some embodiments of the present disclosure the cationic center may be a quaternary ammonium, a quaternary phosphonium, or a tertiary sulfonium. In other embodiments of the present disclosure the cationic center may be another type of positively charged atom.

In some embodiments of the present disclosure the at least one compound may comprise an N-halamine group or a precursor thereof. When connected to the modified surface, the N-halamine group or the precursor thereof provides biocidal activity or the potential for increased biocidal activity.

In some embodiments of the present disclosure, the at least one cationic center is connected to the modified surface separately from the at least one compound that comprises an N-halamine precursor group that is also connected to the modified surface. These embodiments may be achieved by connecting a cationic compound to the modified surface and connecting at least one separate compound that comprises an N-halamine precursor group.

In some embodiments of the present disclosure, the at least one cationic center is connected to the modified surface together with the at least one compound. In these embodiments of the present disclosure, a single compound is connected to the modified surface, the single compound comprises both an N-halamine precursor group and a cationic center. This single compound is be referred to herein as a combined compound.

In some embodiments of the present disclosure, the at least one cationic center is connected to the modified surface both separately from and together with the at least one compound. In these embodiments of the present disclosure, a cationic compound and a combined compound are connected to the modified surface.

Some embodiments of the present disclosure relate to cationic compounds that provide a cationic center but do not include an N-halamine precursor group. Some embodiments of the present disclosure relate to cationic compounds with the following general formula [I]:

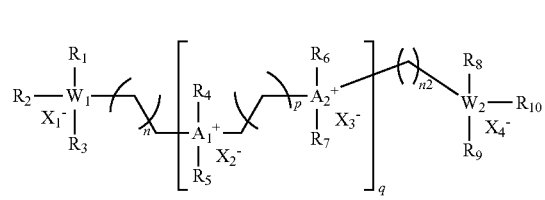

[I]

wherein $R_1$, $R_2$ and $R_3$ are each selected from a group consisting of azide; an alkyne; $CH_3$; $CH_2CH_3$; phenyl; $C_3H_6NH_2$; $CH_3H_5\!=\!CH_2$; $C_3H_4\!\equiv\!CH$; $CH_2CH_2R_{13}$;

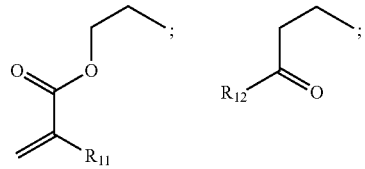

an alcohol; a primary amine; a secondary amine; a tertiary amine; an ether; an epoxide; a carbonyl group; a derivative of a carbonyl group including an acyl, an aldehyde, a ketone, a carboxylic acid, an anhydride, an ester, and an amide; an alkyl halide including a vinyl chloride, a vinyl fluoride; a vinyl group; a derivative of a vinyl group, including a vinyl acetate, a methyl methacrylate, a vinyl-pyridine, a vinyl-benzylidene; an isocyanate group; a carboxyl group and an associated carboxylate ion; a thiol; a phenol group; an imidazole and a combination thereof;

wherein $A_1^+$ and $A_2^+$ are each a cationic center that is independently selected from a group consisting of $N^+$, $P^+$, $S^+$ or nil;

wherein $R_4$, $R_5$, $R_6$ and $R_7$ are independently selected from a group consisting of an alkyl chain of the formula $C_bH_{(2b)}$ where b is an integer between 0 and 20 and a phenyl;

wherein if $A_1^+$ is S, then at least one of $R_4$ or $R_5$ is nil;
wherein if $A_2^+$ is S, then at least one of $R_6$ or $R_7$ is nil;
wherein $X_1^-$, $X_2^-$, $X_3^-$, $X_4^-$ are each a counter ion that is independently selected from a group consisting of nil, $Cl^-$, $Br^-$, $I^-$ and $F^-$;

wherein n and n2 is an integer selected from 0 to 20;
wherein p is an integer selected from 0 to 20;
wherein q is an integer between 1 and infinity;
wherein only one of $W_1$ and $W_2$ is nil, or both are each independently selected from a group consisting of $P^+$, $N^+$, $S^+$, N, C, benzene, a cycloaliphatic or another moiety that is capable of bonding with 3 or more further moieties, such further moieties including H, carbon chains or otherwise, when $W_1$ is other than $P^+$, $N^+$, $S^+$ then $X_1^-$ is nil and when $W_2$ is other than $P^+$, $N^+$, $S^+$ then $X_2^-$ is nil;

wherein $R_8$, $R_9$ and $R_{10}$ are each selected from a group consisting of: azide; an alkyne; $CH_3$; $CH_2CH_3$; phenyl; $C_3H_6NH_2$; $CH_3H_5\!=\!CH_2$; $C_3H_4\!\equiv\!CH$; $CH_2CH_2R_{13}$;

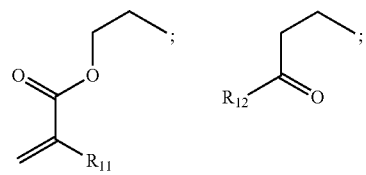

an alcohol; a primary amine; a secondary amine; a tertiary amine; an ether; an epoxide; a carbonyl group; a derivative of a carbonyl group including an acyl, an aldehyde, a ketone, a carboxylic acid, an anhydride, an ester, and an amide; an alkyl halide including a vinyl chloride, a vinyl fluoride; a vinyl group; a derivative of a vinyl group, including a vinyl acetate, a methyl methacrylate, a vinyl-pyridine, a vinyl-benzylidene; an isocyanate group; a carboxyl group and an associated carboxylate ion; a thiol; a phenol group; an imidazole and a combination thereof;

wherein when $W_1$ is $S^+$, at least one of $R_1$, $R_2$ and $R_3$ is nil and the other two moieties together with $S^+$ may form one of

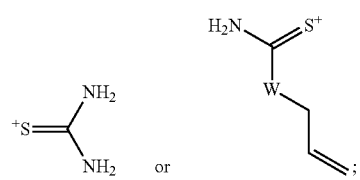

wherein when $W_2$ is $S^+$, at least one of $R_8$, $R_9$ and $R_{10}$ is nil and the oxer two moieties together with $S^+$ may form one of

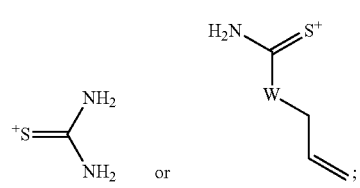

wherein $R_{11}$ is selected from a group consisting of H, $CH_3$ and CN;
wherein $R_{12}$ is selected from a group consisting of H, OH, $NH_2$, $OCH_3$, $OCH_2CH_3$; and
wherein $R_{13}$ may be selected from a group consisting of OH, SH, OCN, CN, NC, SNN and NCS.

Some embodiments of the present disclosure relate to cationic compounds with the following general formulas [II], [III], [IV], [V], [VI] and [VIa] through [VIs]:

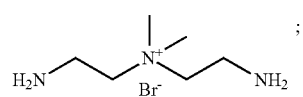
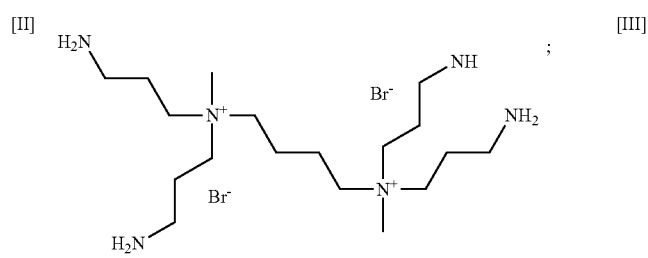
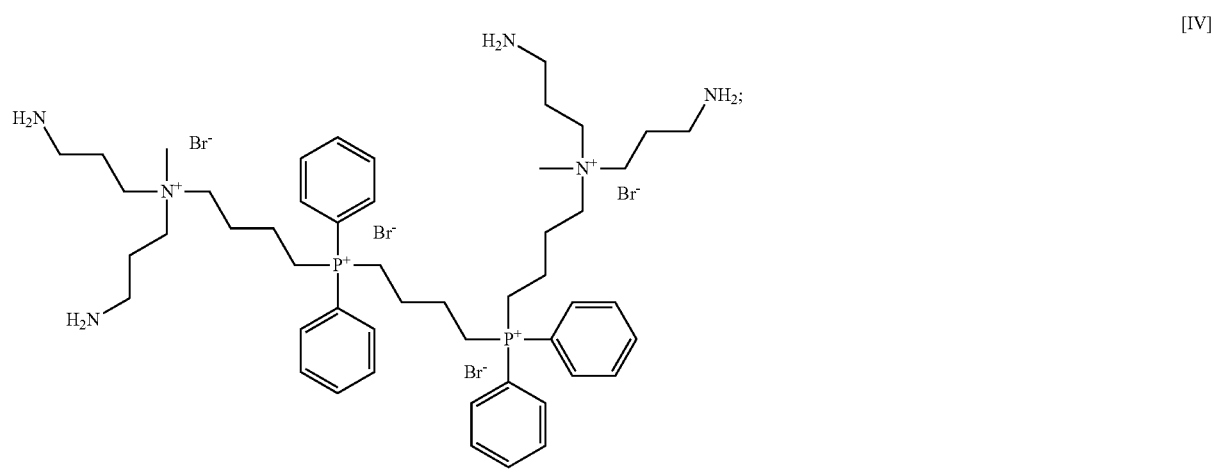
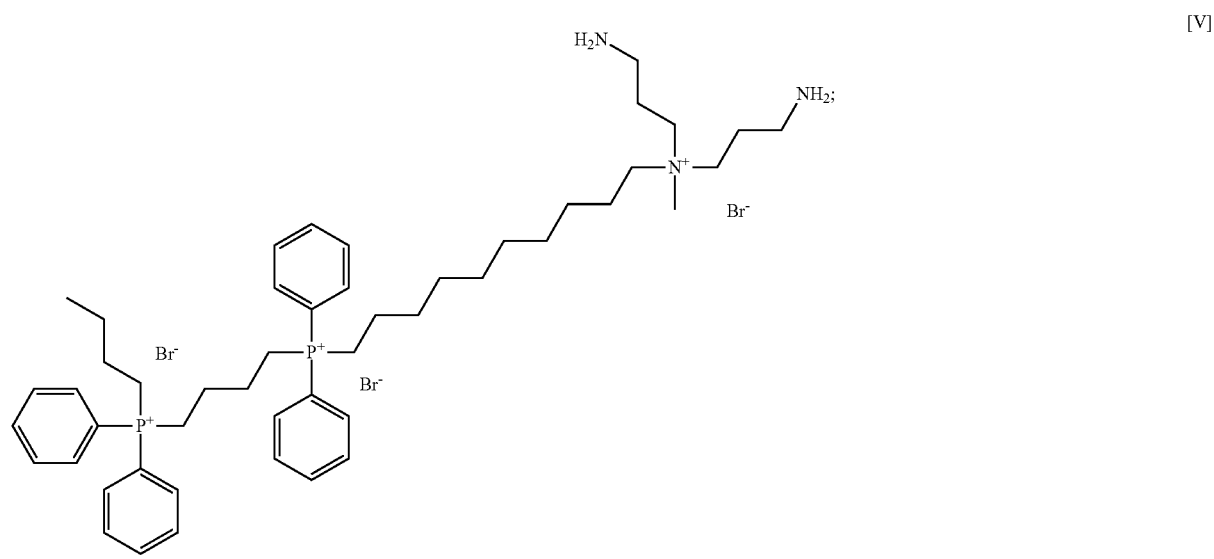

-continued
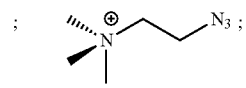   [VI]
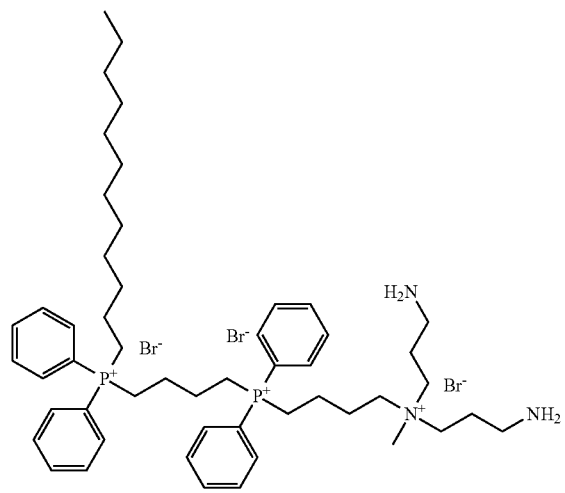
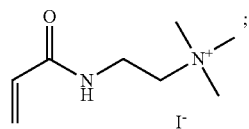   [VIa]
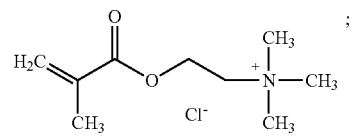   [VIb]
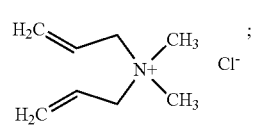   [VIc]
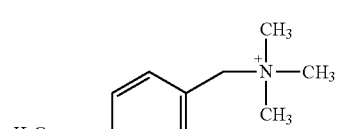   [VId]
   [VIe]
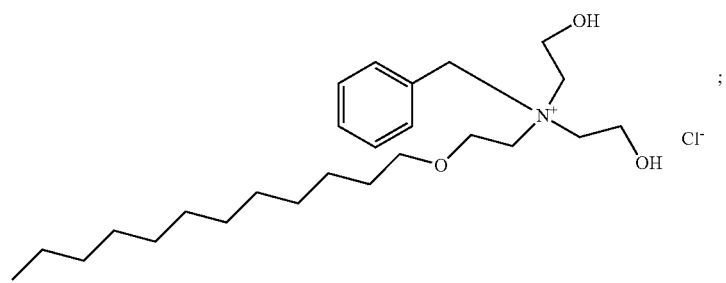   [VIf]
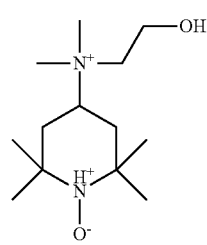   [VIg]
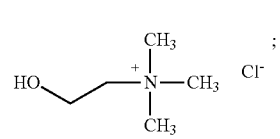   [VIh]
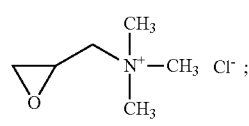   [VIl]
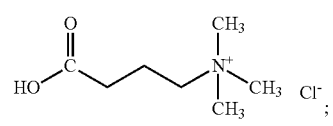   [VIm]

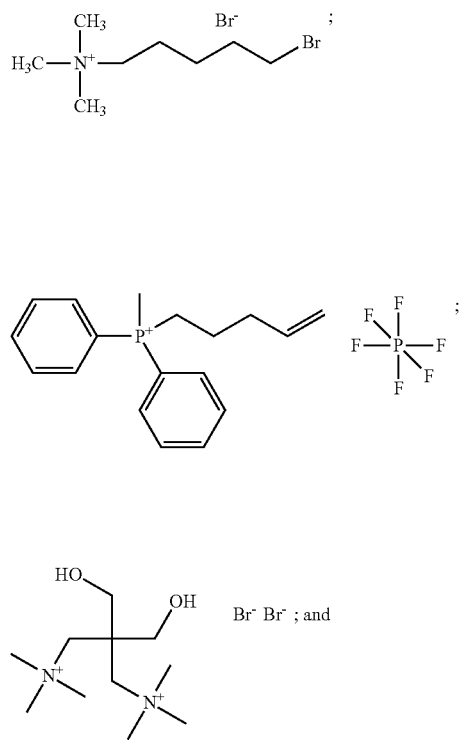

[VIn]

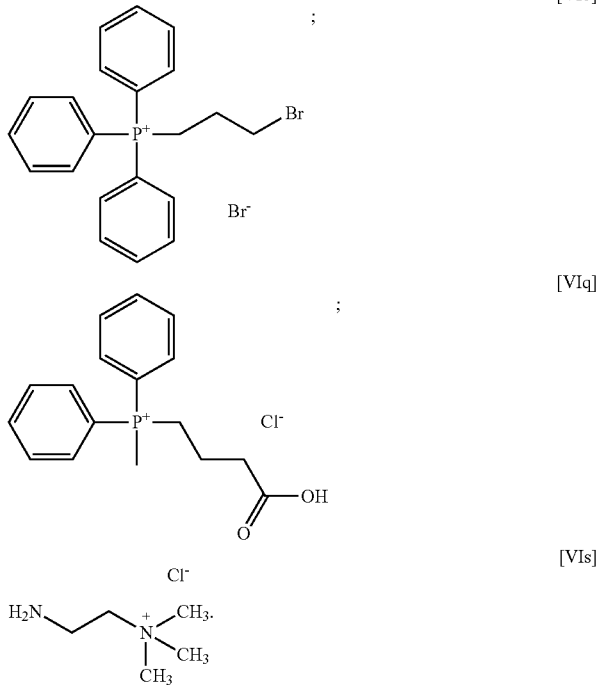

[VIo]

[VIp]

[VIq]

[VIr]

[VIs]

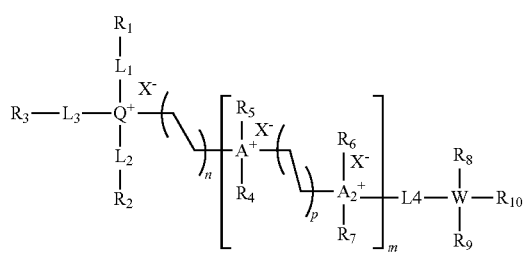

Some embodiments of the present disclosure relate to compounds that comprise at least one N-halamine precursor group. Some embodiments of the present disclosure relate to N-halamine-bearing compounds with the following general formula [VII]:

[VII]

$$R_3—L_3—Q^+\begin{matrix}R_1\\|\\L_1\\|\\X^-\\|\\L_2\\|\\R_2\end{matrix}\left(\begin{matrix}R_5\\|\\X^-\\|\\A_1^+\\|\\R_4\end{matrix}\right)_n\left(\begin{matrix}R_6\\|\\X^-\\|\\A_2^+\\|\\R_7\end{matrix}\right)_p \begin{matrix}R_8\\|\\L_4—W—R_{10}\\|\\R_9\end{matrix}]_m$$

wherein $L_1$, $L_2$, $L_3$ and $L_4$ are independently selected from a group comprising: an alkyl chain of the formula $C_bH_{(2b)}$ where b is an integer between 0 and 20; triazyl, an organic linker-group or nil;

wherein the organic linker-group comprises phenyl, propane, butane, pentane, hexane, cyclic propane, cyclic butane, cyclic pentane or cyclic hexane;

wherein at least one of $R_1$, $R_2$ and $R_3$ is an N-halamine precursor that may be selected from a group consisting of imidazolidine-2,4-dione (hydantoin); 5,5-dimethylhydantoin; 4,4-dimethyl-2-oxazalidione; tetramethyl-2-imidazolidione; 2,2,5,5-tetramethylimidazo-lidin-4-one; a uracil derivative; and piperidine or $R_1$, $R_2$ and $R_3$ are independently selected from a group consisting of nil; H; an alkyl chain of the formula $C_bH_{(2b+1)}$ where b is an integer between 0 and 20; a cyclic organic group including ring structures with at least four carbons and an alcohol; a primary amine; a secondary amine; a tertiary amine; an ether; an epoxide; a carbonyl group; a derivative of a carbonyl group including, an acyl, an aldehyde, a ketone, a carboxylic acid, an anhydride, an ester, and an amide; an alkyl halide, including a vinyl chloride, a vinyl fluoride; a vinyl group; a derivative of a vinyl group, including a vinyl acetate, a methyl methacrylate, a vinyl-pyridine, a vinyl-benzylidene; an isocyanate group; a carboxyl group and an associated carboxylate ion; a thiol; a phenol group; and an imidazole;

wherein $A1^+$ and $A2^+$ are each a cationic center that is independently selected from a group consisting of $N^+$, $P^+$, $S^+$ or nil;

wherein $R_4$, $R_5$, $R_6$ and $R_7$ are independently selected from a group consisting of an alkyl chain of the formula $C_bH_{(2b)}$ where b is an integer between 0 and 20 and a phenyl wherein if $A^+$ is S, then at least one of $R_4$ or $R_5$ is nil;
wherein if $A_2^+$ is S, then at least one of $R_6$ or $R_7$ is nil;
wherein $X_1^-$, $X_2^-$, $X_3^-$, $X_4^-$ are each a counter ion that is independently selected from a group consisting of nil, $Cl^-$, $Br^-$, $I^-$ and $F^-$;

wherein m is an integer that is either one or two;
wherein n is an integer selected from 0 to 20;
wherein p is an integer selected from 0 to 20;
wherein $W_1$ and $W_2$ are each independently selected from a group consisting of nil, but both not being nil, $P^+$, $N^+$, $S^+$, N, C, benzene, a cycloaliphatic or another moiety that is capable of bonding with 3 or more further moieties, such further moieties including H, carbon chains or otherwise, when $W_1$ is other than $P^+$, $N^+$, $S^+$ then $X_1^-$ is nil and when $W_2$ is other than $P^+$, $N^+$, $S^+$ then $X_2^-$ is nil;

wherein $R_8$, $R_9$ and $R_{10}$ are each selected from a group consisting of: an azide; an alkyne; $CH_3$; $CH_2CH_3$; phenyl; $C_3H_6NH_2$; $CH_3H_5\!=\!CH_2$; $C_3H_4\!\equiv\!CH$; $CH_2CH_2R_{13}$;

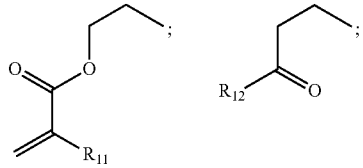

an alcohol; a primary amine; a secondary amine; a tertiary amine; an ether; an epoxide; a carbonyl group; a derivative of a carbonyl group including an acyl, an aldehyde, a ketone, a carboxylic acid, an anhydride; an ester, and an amide; an alkyl halide including a vinyl chloride, a vinyl fluoride; a vinyl group; a derivative of a vinyl group, including a vinyl acetate, a methyl methacrylate, a vinyl-pyridine, a vinyl-benzylidene; an isocyanate group; a carboxyl group and an associated carboxylate ion; a thiol; a phenol group; an imidazole and a combination thereof;

wherein when $W_1$ is $S^+$, at least one of $R_1$, $R_2$ and $R_3$ is nil and the other two moieties together with $S^+$ may form one of

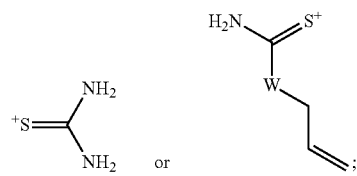

wherein when $W_2$ is $S^+$, at least one of $R_8$, $R_9$ and $R_{10}$ is nil and the other two moieties together with $S^+$ may form one of

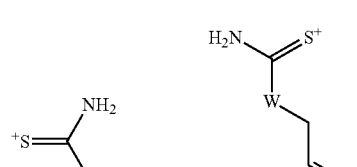

wherein $R_{11}$ is selected from a group consisting of H, $CH_3$ and CN;

wherein $R_{12}$ is selected from a group consisting of H, OH, $NH_2$, $OCH_3$, $OCH_2CH_3$; and wherein $R_{13}$ may be selected from a group consisting of OH, SH, OCN, CN, NC, SNN and NCS.

Some further embodiments of the present disclosure relate to N-halamine-bearing compounds with one of the following general formulas [VIII] to [XVI]:

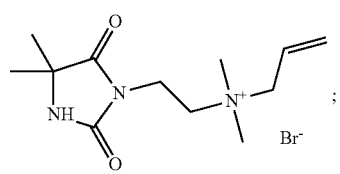
[VIII]

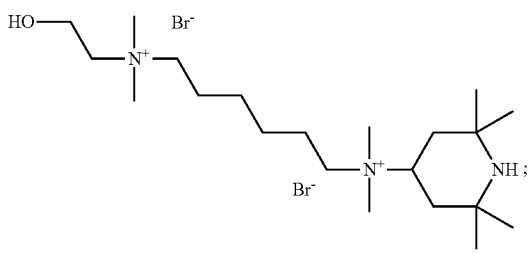
[IX]

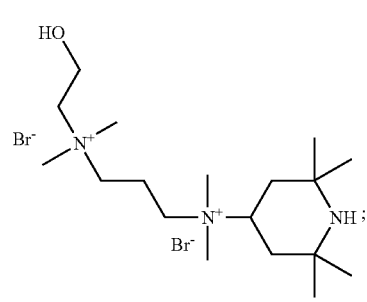
[X]

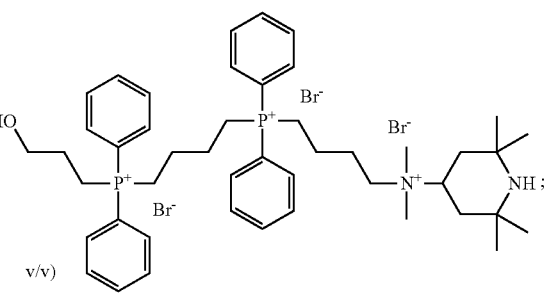
[XI]

v/v)

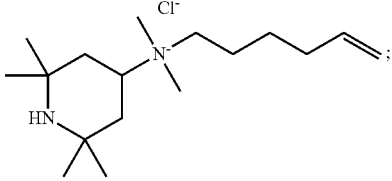
[XII]

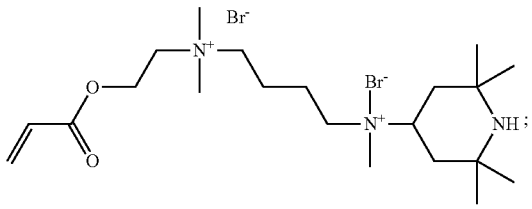
[XIII]

[XIV]

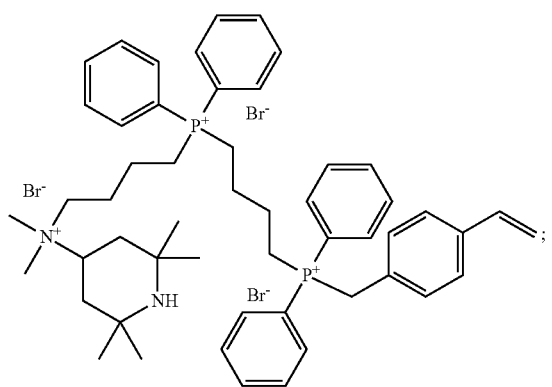

[XV]

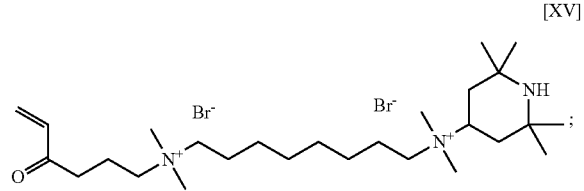

[XVI]

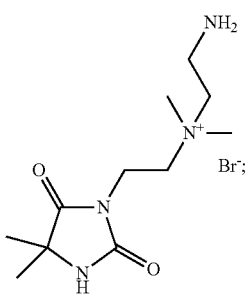

[XVII]

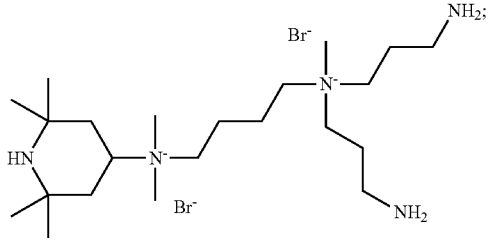

[XVIII]

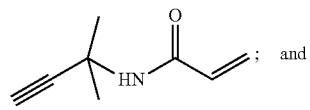

; and

[XIX]

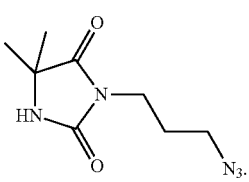

In accordance with other embodiments of the present disclosure, a substrate is provided. The substrate may be a soft substrate or a relatively hard substrate. In some embodiments of the present disclosure the soft substrate may be a textile. In some embodiments of the present disclosure the relatively hard substrate may be one of a metal, a metal alloy, a hard polymer, a flexible polymer, a rigid polymer, a thermoplastic polymer, a thermoset polymer, glass, ceramic, wood or combinations thereof.

In some embodiments of the present disclosure the substrate comprises at least one surface that is modified so that at least one cationic center is connected to the modified surface as a cationic compound, which is separate and distinct from a compound that comprises an N-halamine precursor group. In some embodiments of the present disclosure the substrate comprises at least one surface that is modified so that a combined compound is connected to the modified surface, the combined compound that comprises at least one cationic center and at least one N-halamine precursor group. In other embodiments of the present disclosure the substrate comprises at least one surface that is modified so that at least one cationic center is connected to the modified surface as a cationic compound, which is separate and distinct from a combined compound that comprises at least one cationic center and at least one N-halamine precursor group.

The surface may be modified by any known or not yet known method of modifying a surface so that the at least one cationic center and the at least one compound are connected to the modified surface. There are various known methods for modifying a substrate's surface. These methods can generally be categorized as laboratory methods or industrial methods. The method utilized in modifying the substrate' surfaces dictates how applicable the method is for industrial-scaled use. Various industries over time have subscribed to standardized processing methods that provide the production parameters of throughput, yield and consistency of quality control. These industrial methods require specific infrastructure. However, many laboratory methods are impractical for industrial-scaled use because the specific nature of the infrastructure required for the laboratory methods are often cost prohibitive and require a high degree of technical training to operate and maintain. Laboratory methods may also have other shortfalls that are related to production parameters that are expected from industrial-scaled uses.

Some known laboratory methods that may be used to modify a substrate surface include, but are not limited to:

Interpenetrating Network (IPN)—This is typically done in situations where one polymer network has already been formed on or near the substrate's surface already. On example of this situation is fabric or textile that includes a polymer that is modified on the molecular level. To form an IPN on the fabric the fabric may be soaked and swollen in a solution of a certain monomer, crosslinking compounds and usually an initiator. The monomer is chosen based on the desired outcome and end use for the modified surface. The polymer is then crosslinked by heat, ultraviolet radiation (UV) or both. Some shortcomings of the IPN method include, but are not limited to: crosslinking a polymer network in textiles may create a hard/rigid crystalline, semi-crystalline or amorphous polymer-network that results in a rigid textile-product; the process of swelling, crosslinking and then bonding any active compounds onto the fabric is both a time consuming, multi-step process that is mostly done in small batches on a lab scale; and many of the monomers, solvents and cross linkers used may be toxic to humans and/or the environment.

Layer-by-Layer deposition (LBL)—This method utilizes a charged surface-substrate such as bleached cotton (negatively charged) that may interact with a further functionally-active polymer based on electrostatic forces or covalent bonds. In some case, a positively charged monomer or copolymer can be deposited onto the surface through these bonds. The LBL method include rinsing a negatively-charged substrate in a positively-charged solution, followed by drying and subsequent rinsing in a negatively-charged solution. The process is then repeated depositing monomers or copolymers layer by layer. Some shortcomings of the LBL method include, but are not limited to: instances where well developed formulations are pre-engineered for textile applications which are typically applied in a one-time application (such as Pad-Dry-Cure). The coating process would then not be viable if the standard formulation provided a neutrally charged surface or did not provide an initial covalent-bonding site; and even if such pre-engineered formulation is polar or provides initial reactive sites, there could be further significant costs associated with the additional equipment required, processing time, processing costs and added raw material costs.

Grafting—This laboratory method can divided into two categories: (i) "grafting to" and (ii) "grafting from". Generally, grafting involves tethering monomers or copolymers (by covalent bonds) to the backbone of an existing polymer structure. The functional polymer being grafted is added to an existing long chain polymer creating a segmented copolymer. The main mechanism from which grafting methods are employed require functional groups to be present on the substrate; however, in many cases the substrate may lack the appropriate functional groups, which may require the substrate to be pre-modified prior to grafting. The following modes of reaction are employed in grafting technology: ionic grafting; free-radical grafting; living polymerization grafting (variant of free radical). The reaction techniques for grafting may include: chemical; radiation; photochemical; plasma radiation; and enzyme mediated. Grafting is a process which has limited industrial-scaled use for modification of existing surfaces, the majority of reaction techniques are not simple application methods. They require specialized equipment and multiple steps. Equipment size is limited and the process yields may also be limited. To be feasible in a non-chemical manufacturing environment, the process is limited to thin films and likely to application geometry (surface area and shape of object being treated). The inherent issue with this process is that it requires the handling an application of small molecular-weight chemicals, which can be highly toxic and require a controlled environment.

The "grafting to" approach may make use of functionally-terminated monomers or copolymers and a corresponding reactive-group on the substrate surface. Typically the corresponding reactive-group exists on the backbone of a polymer that already exists on the surface. The reaction can be achieved in a solution or through polymers in liquid state. The reaction typically requires time, temperature or initiators and combinations thereof to complete the reaction. This method may provide limited branched-density due to steric hindrance.

The "grafting from" approach relies on depositing an immobilized initiator on the surface, forming many small initiator sites or a macro-initiator structure. The functional Monomers are then deposited on the surface and a reaction is induced to polymerize the chain branch off the surface. It is possible to grow the branch further based on chemistry available on the new branched copolymer. Essentially, the process is growing the monomer off the surface with radical reactions. Allows more control than grafting from approach.

"Click" Chemistry (Click)—While click chemistry typically has been used for specialized chemical reactions focused on tagging biomolecules for spectrometric quantification in cellular and drug interaction research, there are more ways that this laboratory method can be applied. Azide-alkyne cyclo addition, more commonly called click chemistry or "tagging" uses a highly thermodynamically favoured reaction to join two molecule groups via an efficient, irreversible chemical bond in a high yield reaction. At least one shortcoming of the Click method is that often it requires a multi-step process: first to impart one of the active terminals onto the desired surface; and second to perform the click reaction which can take between 6 to 12 hours. From an industrial-scale perspective that is a long time, especially because the method requires that the substrate is submerged in the reaction solution and agitated for that whole time. To adapt the Click method for an industrial-scaled use, the soaking step would likely require an infrastructure investment to accommodate many loops of the product through a soaking bath, and the product throughput would decrease significantly, which may add significant cost to the process.

Spin Coating—Spin coating may be achieved by the following steps: first the substrate's surface is coated in an ink that contains molecules with a desired functionality dissolved in a solvent; then the substrate is rotated at high speed and the majority of the ink is flung off the side; airflow then dries the majority of the solvent, leaving a plasticised film before the plasticised-film fully dries so that only the molecules remain on the substrate's surface. Spin coatings are used in production industries for flat objects and various electronics applications. In terms of industrial-scaled uses, the process is not suited for complex shapes and high-yield outputs.

The industrial methods for modifying a surface may be further categorized into applications for soft substrates, such as textiles, and applications for hard substrates. Known industrial methods that are used to modify a soft-substrate surface include, but are not limited to:

Knife coating;
Direct roll coating;
Pad-Dry-Cure;
Calendar Coating;
Foam Finishing;
Hot-melt Extrusion Coating;
Infrared and ultraviolet light curing; and
Spray coating such as dry powder coating The type of functionality that it is desired to incorporate on the modified surface may influence the soft-substrate industrial method chosen. Each process has a place in processing of textiles depending on the business case. The cost, yield and batch size may also play a factor in the soft-substrate industrial method chosen. Processes with reduced energy input and small batch economics are potential drivers in the coating method chosen.

Known industrial methods that are used to modify a hard-substrate surface include, but are not limited to:

Vapour Deposition—There are several further methods that fall within the general category of vapour deposition. The main techniques include: (i) physical vapour deposition (PVD); or (ii) chemical vapour deposition (CVD).

PVD requires particles to be vaporized and deposited to a substrate in vacuum. Due to this general procedure difficulties and limited end-use articles are possible. Thermal stability is required at the required temperatures to vaporize the particles without thermal degradation. Other shortcomings of PVD may also include higher costs, specific heating and vacuum infrastructure and heat requirements limiting the applicable chemistries.

CVD allows coatings to be deposited without the use of solvents. This process requires gas-phase monomers to be polymerized into highly crosslinked networks on a colder substrate. This process is widely utilized in inorganic coating methods. The use of organic coatings is mainly in thin-film applications for electronics and packaging. The process can be utilized in low pressure or high vacuum environments depending on the chemistry used. Some shortcomings of CVD may include: higher cost than wet chemistry; specialized equipment required for the specific technique used; fairly limited chemistries due to heating requirements and vaporization requirements; limited application size due to equipment constraints; it is a complex process with specific processing conditions; thick film applications may not be feasible in many industries; and there may be limited production yields due to equipment and processing time requirements.

Liquid Deposition (brush, roll or spray)—These methods may be the most commonly used industrial methods for modifying a substrate's surface. These methods consist of spraying, rolling and brushing a liquid polymer onto the substrate's surface. The application to the substrate is typically followed by drying or drying and curing process. This method covers many paint applications as well as commercial coatings products due to it's simplicity and low relatively low capital requirements. Some shortcoming of these methods may include: limited control of film thickness; the process may lend itself to human error; performance may be limited to chemistries within a given jurisdiction's environmental guidelines; and these methods are typically bulk-application methods, which may induce variability in film thickness and distribution of the desired functional molecules within the film.

Powder Spray Coating (PSC)—PSC is a common industrial method. Small particles are discharged as a spray and electrostatically adhered to a substrate's surface. The particles are then heated and allowed to melt or flow in a lower viscosity state. The coating is then able to crosslink and cure forming a solid film. Some shortcomings of PSC may include: higher cure temperatures may be required; specialized infrastructure and equipment may be required; there may be limited chemistries available for industrial-scale uses; there may be limited applicable substrates due to the cure temperature requirements and further possible incompatibilities between the charged particles and the substrate; and some electrochemical processes may be limited to metal substrates only.

Dipping Bed (DB) and Fluidized Bed (FB) application—The DB method is well characterized and it is one of the most basic of industrial methods. The DB method involves submersing or dipping the substrate into a bath of polymer whereby the substrate is removed at a controlled rate and any solvent is evaporated thereby completing the polymerization on the surface. DB methods can be used in conjunction with UV curing, oven curing or infrared curing. Other forms of DB methods include roll and sheet based processes where a substrate is put through any type of bath or solution. The FB method is similar to the DB method and it may be considered a variant of powder coating. With this process a heated article is placed into a fluidized powder, the powder then melts onto the substrate with a film formation based on latent heat and a desired thickness of the coating. The substrate is then removed from the tank. The process can also be used in an electrostatic fluidized bed. Some shortcomings of the DB and FB methods may include: cannot be used on substrates that will not hold their shape; and substrates that may generate gasses during heating require further specific infrastructure or may not be used at all.

At least the laboratory methods and industrial methods described herein above may be used to modify the surface of a substrate so that both of the at least one cationic center and the at least one compound are connected to and available upon the modified surface to react with other chemicals or microorganisms that may come into contact with or near to the modified surface.

In some embodiments of the present disclosure, the at least one cationic center is connected to the modified surface separately from at least one compound that comprises an N-halamine precursor group that is also connected to the modified surface. These embodiments may be achieved by connecting a cationic compound to the modified surface and connecting at least one separate compound that comprises an N-halamine precursor group. The cationic compound and the at least one separate compound are different compounds both of which are connected to the modified surface.

Some embodiments of the present disclosure relate to coating formulations that comprise a combined compound and at least one further component. These coating formulations may represent examples of the embodiments of the present disclosure that relate to modified surfaces that have the at least one cationic center connected to the modified surface together with the at least one compound that comprises an N-halamine precursor group.

Some embodiments of the present disclosure relate to coating formulations that comprise a combined compound, at least one further component and a cationic compound. These coating formulations may represent an example of the embodiments of the present disclosure that relate to modified surfaces that have at least one cationic center connected to the modified surface with an N-halamine bearing compound and at least one further cationic center that is separately connected to the modified surfaces.

In embodiments of the present disclosure that relate to coating formulations, the combined compound may further comprise a coating incorporation group (CIG). In other embodiments of the present disclosure that relate to coating formulations one or both of the combined compound and the cationic compound comprise a CIG. The CIG includes one or more functional groups, or moieties, that react with the at least one further component of the coating formulation. In some examples, the coating composition may further comprise a component that acts as a crosslinking agent. In some embodiments of the present disclosure, when a CIG of a compound is present it may incorporate the one or both of the combined compound or the cationic compound into a polymer within the coating composition. For example when the CIG is:

- a mono-amine, the CIG may be useful for chain growth polymerization into epoxy or polyurethane systems;
- a dual or poly terminated amine, the CIG may allow for curing into epoxy systems through a crosslinking mechanism;
- a dual or poly terminated carboxylic acid, the CIG may allow for curing into epoxy or polyurethane systems through a crosslinking mechanism;
- a hydroxyl group, or a carboxylic acid group, the CIG may be used to tether molecules to epoxide groups present on a surface, as long as a competitive curing process is not taking place at the same time;
- multiple hydroxyls or carboxylic acid groups, the CIG may react into polyurethane polymers through chain growth polymerization and during a cure within a crosslinking reaction;
- a vinyl group or vinyl-acetate group, the CIG may react with various base polymers such as vinyl or silicone based systems in the presence of a modified melamine crosslinker through a step growth polymerization process;
- a vinyl acetate group, the CIG may react with ester groups in most any polymer backbone through a step growth polymerization process;
- a vinyl acetate group, the CIG may homopolymerize to form acrylic or acrylate polymers, or be copolymerized with other moieties to also form vinyl or latex thermoplastic polymers; and
- a vinyl functionality of two or greater in copolymerization with unsaturated polyesters and modified polyesters through condensation polymerization with a glycol and diacid monomer. Forming an unsaturated copolymer;
- a vinyl functionality of two or greater as a cross-linking agent in unsaturated polyester resins and modified polyester resins. Polymer matrix achieved through radical polymerization. Forming a thermoset matrix via chain growth;
- an above-mentioned copolymer with available double or triple bonds utilized as a cross-linking agent in unsaturated polyester resins and modified polyester resins. A polymer matrix may be achieved through radical polymerization. Forming a thermoset matrix via chain growth;
- an above-mentioned copolymer with available double or triple bonds utilized with a cross-linking agent (e.g. styrene) and initiator (such as MEKP). A polymer matrix may be achieved through radical polymerization. Forming a thermoset matrix via chain growth;
- an alkene or vinyl group, which can homopolymerize to form a polyolefin polymer, or be copolymerized with other moieties to form polyethylene, polypropylene, polybutylene, poly(vinyl chloride), or other thermoplastic polymers through an addition polymerization process, or a radical polymerization process; and
- an alkene or vinyl group, which can be co-polymerized with other moieties including but not limited to perfluorocycloalkene, ethylene, vinyl fluoride, vinylidene fluoride (1,1-difluoroethylene), tetrafluoroethylene, chlorotrifluoroethylene, propylene, hexafluoropropylene, perfluoropropylvinylether and perfluoromethylvinylether to form a fluoropolymer through an addition polymerization process, a radical polymerization process, or other polymerization method.

Definitions

Unless defined otherwise, all technical and scientific terms used herein have the same meaning as commonly understood by one of ordinary skill in the art to which this disclosure belongs.

As used herein, the term "about" refers to an approximately +/−10% variation from a given value. It is to be understood that such a variation is always included in any given value provided herein, whether or not it is specifically referred to.

As used herein, the term "activity" refers to biocidal activity.

As used herein, the terms "biocide", refers to a chemical compound, a chemical composition or a chemical formulation that can kill or render harmless one or more microbes.

As used herein, the term "cationic center", refers to compounds in which four organic groups are linked to a single positively-charged atom (cation) of the structure $XR4^+$ where X is one of nitrogen, phosphorus or sulfur and R is an organic group.

As used herein, the term "cationic compound" refers to a chemical compound that comprises at least one cationic center but does not include an N-halamine group.

As used herein, the terms "halo" or "halogen" by themselves or as part of another substituent, have the same meaning as commonly understood by one of ordinary skill in the art, and preferably refer to chlorine, bromine or iodine atom.

As used herein, the terms "microbe" and "microbes" refer to one or more single celled, or multi-cellular, microorganisms exemplified by at least one of bacterium, archaea, yeast or fungi.

As used herein, the term "N-halamine" refers to a functional group containing one or more nitrogen-halogen covalent bonds that is normally formed by the halogenation of imide, amide or amine groups of a compound. The presence of the halogen renders the functional group biocidal. N-halamines, as referred to in the present disclosure, include both cyclic and acyclic N-halamine functional groups.

As used herein, the term "N-halamine bearing-group" refers to a chemical compound that comprises an N-halamine precursor group or an N-halamine functional group.

As used herein, the terms "N-halamine precursor" and ""N-halamine precursor group" may be used synonymously and can be any N—H, preferably with the absence of an alpha hydrogen, as part of either a cyclic or acyclic organic structure. These functional groups may contain one or more nitrogen-hydrogen bonds that can be converted into a one or more nitrogen-halogen bonds normally formed by the halogenation of imide, amide or amine groups of the functional group. The presence of the halogen may convert an N-halamine precursor into an N-halamine, which may render the functional group biocidal.

As used herein, the term "nil" means absent and/or a direct bond.

As used herein, the term "organic linker group" includes at least the following functional groups phenyl, propane, butane, pentane, hexane, cyclic propane, cyclic butane, cyclic pentane or cyclic hexane.

As used herein "QAS" is a reference to a quaternary ammonium compound with the following structure:

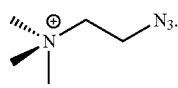

As used herein, the terms "quaternary ammonium cation", "quaternary ammonium compound", "quaternary ammonium salt", "QAC", and "quat" may be used interchangeably throughout the present disclosure to refer to ammonium compounds in which four organic groups are linked to a nitrogen atom that produces a positively charged ion (cation) of the structure NR4+.

EXAMPLES

Methodology
Soft-Surface Iodiometric Titration

The modified surfaces were tested for chlorination uptake. For example, the samples of modified surfaces that were tested for mass changes were cut to 1"×1" squares. To chlorinate the samples, 50 mL of ultrapure water was added to a 250 mL Erlenmeyer flask. A bleach solution of 72678 ppm of chlorine was then added to the flask to achieve the desired range of chlorination solution concentrations (for example 68.79 μL to achieve 100 ppm, and 1031 μL to achieve 1500 ppm). After briefly stirring the bleach into the solution, the uncoated samples were added and secured in a shaker, and then shaken for 1 hour. After an hour, the solution was drained from the flask and washed 4 times with distilled water to remove excess chlorine. The Coated Samples were then set out for an hour in open air to dry.

The concentration of active chlorine on the fabric samples was analyzed by a traditional iodometric titration method. Each 1×1 inch sample was immersed in a solution of 30 mL distilled water and 25 mL of 0.001N sodium thiosulfate standard solution. After stirring in a 100 mL beaker with a magnetic stir rod for 60 min, 2 mL of 5% acetic acid buffer solution was added. Then, with continued stirring, the solution was titrated with 0.001N iodine standard solution by monitoring millivolt changes with a redox electrode (platinum Ag/AgCl). The active chlorine concentration of the samples was then calculated from the following equation [Eq. A]:

$$[Cl^+] \text{ (ppm)} = \frac{35.45 \times (V_1 - V_2) \times N \times 1000}{(2 \times W)}. \quad \text{[Eq. A]}$$

where V1 and V2 are the volumes (mL) of the iodine solution consumed in titrations of blank sodium thiosulfate solution and that with PET sample in, respectively. N is the normality of iodine solution; and W is the weight of the samples in grams. This process was done for each final product to determine the active chlorine concentrations resulting from chlorination for both AS1 and NC2 samples.

Hard-surface Iodiometric Titration

The active-chlorine surface loading of the hard surfaces that were coated with Coating Formulations 24 to 53 were tested. Briefly, after exposing the coated substrate to chlorine the substrate was washed 4-5 times in distilled water, pat down with a towel and then allowed to air dry. The following modification of the iodiometric-titration method described above was performed:

For each sample, a solution of 25 mL 0.001N sodium thiosulfate and 30 mL of ultrapure water was prepared in a 100 mL beaker. A magnetic stirring bar and one sample was added to each of the filled beakers. Each sample was stirred for a full hour before testing. The burette was rinsed with iodine solution three times before use. The burette was then filled with iodine solution and set up in a holder over the stirring base. While the samples were in the stirring process the titration control was performed. A volumetric pipet was used to add the same volume of sodium thiosulfate solution as to what was used for the quenching of samples in a 100 mL beaker with 30 mL ultrapure water. A small stirring bar was added to the beaker as was 2 mL a 5% acetic acid buffer and then stirring was commenced.

The electrode was set up erectly in the beaker and the start button on the conductivity/pH bench top meter was pressed to electric potential mode (mV). Iodine solution was added while observing the mV change shown on the pH meter. Electric potential (mV) first decreased then increased with the addition of the iodine solution. The endpoint of this titration is the point at which the electric potential shows a sudden jump. As for this titration the electric potential change is significant, so the mV change was used as the signal of endpoint. Record the ending reading in the burette. ΔV in this process is just the V1 in equation (2).

After stirring for an hour 2 mL of the acetic acid buffer was added to the beaker of each sample, again the volume reading on the burette was noted.

From this point, each sample was titrated where ΔV in this process is the V2 in the equation B [Eq. B] which can be used to calculate the active chlorine concentration on the hard surface as follows:

$$\text{Active Chlorine } [Cl^+]\left(\frac{\mu g}{cm^2}\right) = \quad \text{[Eq. B]}$$

$$\frac{35.45\left(\frac{g}{mol}\right) \times (V_1 - V_2)(mL)\left(\frac{L}{1000 \text{ mL}}\right) \times N\left(\frac{mol}{L}\right) \times 1000000}{2 \times A(cm^2)}.$$

where V1 and V2 are the volumes (mL) of the iodine solution consumed in titrations of the sodium thiosulfate control and the chlorinated sample respectively. N is the normality of iodine solution (eq. mol/L) and A is the surface area of the sample in cm2.

Biocidal Activity Assessment

The biocidal properties of various of the Coated Samples were examined against clinical isolates of CA-Methicillin-resistant *Staphylococcus aureus* (MRSA) (#40065, community-associated,) and *E. coli* (ATCC 25922) using a "sandwich test" modified from AATCC 100 standard testing method. Logarithmic-phase bacterial cultures were prepared by initially suspending several colonies in tap/hard water at a density equivalent to 0.5 McFarland standard of 108 colony-forming units (CFU)/mL, and then diluted 100 times to 106 CFU/mL. 20 μL of the diluted CA-MRSA and *E. coli* (ATCC 25922) solutions were added into 60 mL of Tryptone Soya Broth and MacConkey Broth, respectively. After 16-18 hour incubation at 37° C., the logarithmic-phase bacterial cultures were ready for use. The test fabrics were cut into square swatches (1×1 inch), one of which was put in a sterilized container. 100 μL of the logarithmic-phase bacterial suspensions (5×10⁵-1×10⁶ CFU/mL) was added to the swatch center and then sandwiched with another piece of swatch. The whole "sandwich" set was held in place by sterile weights. The contact times for chlorinated samples were 1, 5, 10, 30 and 60 min, while for silver coated samples were 1, 2, 4 and 6 hours. Then, the samples were quenched with 5.0 mL of sterile 0.05M sodium thiosulfate solution to remove all oxidative chlorine, followed by 2 min of vortexing and 1 min of sonication. Serial dilutions of the solutions of vortexed and sonicated bacteria were made in tap/hard water, and they were plated on Tryptone Soya Agar. The plates were incubated at 37° C. for 24 h, and viable bacterial colonies were recorded for bactericidal efficacy analysis. The percentage reduction of bacteria (%)=(A−B)/A×100; and the logarithm reduction=log (A/B) if B>0; =log (A) if B=0, where A is the number of bacteria from blank control, and B is the number of bacteria recovered from the inoculated test specimen swatches.

Commercially available N-chloramine treated fabric (CLOROX®) was also selected for assessing the biocidal activity. Due to its high absorbency and fluffy texture, it is difficult to fully extract bacterial cells from the Clorox sample in merely 5 mL of neutralizer (sodium thiosulfate) solution. Instead, the original AATCC 100 test method was used, where 1 mL of bacterial suspension ($5\times10^5$-$1\times10^6$ CFU/mL) were completely absorbed by 2 pieces of square swatches 1×1 inch of N-chloramine treated fabrics (Clorox).

At a selected time point, bacterial cells were extracted in 100 mL of sterile 0.05M sodium thiosulfate solution, following 2 min of vortexing and 1 min of sonication. Serial dilutions were made and plated on Tryptone Soya Agar, and viable colonies were recorded after 24-hour incubation at 37° C.

MRSA is one of the most frequently isolated organisms that contributes to healthcare associated infections (HAIs). Thus, it was selected to evaluate the biocidal activity of the coated substrates 12A along with the other commercially available modified textile products described above.

Surface Charge Assessment

The method employed the use of ultraviolet visible spectroscopy. Samples were cut into 1 cm×1 cm and were placed in 1 Wt. % solution of fluorescein (sodium salt) aqueous solution for 20 minutes. The samples were then rinsed with deionized water and placed in a 0.1 Wt. % aqueous solution of cetyltrimethylammonium chloride. The samples that were placed in the solution were then shaken for 40 minutes in a wrist action shaker. After the samples were shook 10% V/V of a phosphate buffer pH 8.0 was added. The absorbance of the resulting solution was then measured. The molar extinction coefficient that was used was 11 nM-1 cm-1. Calculations that were used are based on formula sited in the following articles which are incorporated by reference into the disclosure: N. Zander et al. (2008) Charge Density Quantification of Antimicrobial Efficacy, Army Research Laboratory, the entire disclosure of which is incorporated herein by reference; and H. Murata et al. (2007) *Permanent, non-leaching antibacterial surfaces*-2: *How high density cationic surfaces kill bacterial cells* Biomaterials 28(2), the entire disclosure of which is incorporated herein by reference.

Interpenetrating Network (IPN)

The IPN method was used to modify a textile surface so that an N-halamine bearing compound and a cationic compound are separately present on the modified surface. In these examples the textile surface was poly(ethylene terephthalate) (PET). It is understood by those skilled in the art that these examples are non-limiting and that various other laboratory methods or industrial methods can be used to separately connect an N-halamine bearing compound and a cationic compound to a modified surface. Furthermore, it is understood by those skilled in the art that this example does not limit the embodiments of the present disclosure to only textiles, or PET.

Table 1 provides the biocidal activity of a modified surface that includes samples with cyclic N-halamines and QAS.

TABLE 1

Performance of PET treated surface with cyclic N-chloramine and different ratios of QAS on the surface against *E. coli*.

| Modified PET samples Chlorinated | Surfaces bounced Chlorine (ppm) | Bacteria | Contact time (min) | | | | | | | |
|---|---|---|---|---|---|---|---|---|---|---|
| | | | 5 | | 10 | | 20 | | 30 | |
| | | | % reduction | Log Reduction | % reduction | Log Reduction | % reduction | Log Reduction | % reduction | Log reduction |
| 1:7.5 QAS/NH | 299 | MDR-E.Coli 70094 | 98.8 | 2.27 | 99.9 | 3.27 | 100 | 5.46 | 100 | 5.45 |
| 1:2.2 QAS/NH | 276 | | 99.2 | 2.46 | 100 | 5.67 | 100 | 5.46 | 100 | 5.45 |
| 1.7 QAS/NH | 289 | | 99.4 | 2.61 | 100 | 5.67 | 100 | 5..46 | 100 | 5.45 |

Table 2 provides the input ratio of five samples that were connected on to a modified surface.

TABLE 2

Summary of samples 1 to 5 and the ratio of QAS to azido hydantoin.

| | # moles | | Input Ratio QAS/azido |
|---|---|---|---|
| Sample | QAS | Azido hydantoin | hydantoin |
| 1 | 0.2 | 0.2 | 1:1 |
| 2 | 0.467 | 0.2 | 7:3 |
| 3 | 0.0857 | 0.2 | 3:7 |
| 4 | 0 | 0.2 | 0:100 |
| 5 | 0.8 | 0 | 100:0 |

Table 3 summarizes the chlorine loading of a modified surface that includes samples with an input ratio of 30/70 QAS/AzH, 50/50 QAS/AzH, 70/30 QAS/AzH and 100/0 QAS/AzH and that was exposed to 1500 ppm of chlorine for 60 minutes.

TABLE 3

Chlorine loading on a modified surface after clicking QAS in various ratios.

| Sample | PET-PMBAA-AzH Chlorine (ppm) | PET-PMBAA-AzH/QAS Chlorine (ppm) |
|---|---|---|
| 30/70 QAS/AzH | 184 | 315 |
| 50/50 QAS/AzH | 170 | 585 |
| 70/30 QAS/AzH | 177 | 860 |
| 100/0 QAS/AzH | 68 | 732 |

Available chlorine = 1500 ppm;
duration = 1 hr;
pH = 8;

The 100/0 QAS/AzH sample included acyclic n-halamine, which may explain the observed surface bound chlorine in samples that did not include the AzH.

Table 4 summarizes chlorine loading of a modified surface that includes samples with an input ratio of 70/0 QAS/AzH, 0/30 QAS/AzH and 70/30 QAS/AzH and that was exposed to 1500 ppm of chlorine for 60 minutes.

TABLE 4

Surface bound chlorine loading data for modified surfaces with different input ratios of QAS to acyclic N-halamine or acyclic and cyclic N-halamine.

| Modified PET | 70/0 QAS/AzH (Acyclic N-Halamine & QAS) | 0/30 QAS/AzH (Cyclic & Acyclic N-Halamine) | 70/30 QAS/AzH (Cyclic N-Halamine, Acyclic N-Halamine & QAS) |
|---|---|---|---|
| Chlorine Loading (ppm) ± SD | 701 ± 28 | 133 ± 5 | 835 ± 24 |

Available chlorine = 1500 ppm;
duration = 1 hr;
pH = 8;

Table 5 summarizes biocide activity of a modified surface that includes samples with an input ratio of 30/70 QAS/AzH and 0/70 QAS/AzH following a challenge with CA-MRSA.

TABLE 5

Antibacterial efficacy of different input ratios of QAS to AzH samples against CA-MRSA.

| Modified PET samples Chlorinated | Surface bound chlorine (ppm) ± SD | Available chlorine (ppm) | Contact time (min) | | | | |
|---|---|---|---|---|---|---|---|
| | | | 5 % reduction | 10 % reduction | 15 % reduction | 30 % reduction | 30 Log Reduction |
| 30/70 QAS/AzH | 299 ± 5 | 3500 | 60.1 | 71.41 | 89.21 | 100 | 5.8 |
| 0/70 QAS/AzH | 299 ± 5 | 3500 | 15.15 | 16.67 | 75.81 | 94.73 | 1.27 |

Inoculum concentration = 8 × 10$^6$ CFU/ml; duration = 1 hr; pH = 8;

Table 6 summarizes biocide activity of a modified surface that includes samples with an input ratio of 30/70 QAS/AzH and 0/70 QAS/AzH following a challenge with MDR-*E. coli*.

TABLE 6

Antibacterial efficacy of different input ratios of QAS to AzH samples against MDR-*E. coli*.

| Modified PET samples Chlorinated | Chlorine (ppm) ± SD | Available chlorine (ppm) | Contact time (min) | | | | | | |
|---|---|---|---|---|---|---|---|---|---|
| | | | 10 % reduction | 20 % reduction | 20 Log Reduction | 30 % reduction | 30 Log Reduction | 60 % reduction | 60 Log Reduction |
| 30/70 QAS/AzH | 149 ± 0 | 3500 | 84 | 100 | 3.67 | 100 | 5.44 | 100 | 5.44 |
| 0/70 QAS/AzH | 146 ± 14 | 1500 | 24.6 | 76.7 | 0.63 | 100 | 3.27 | 100 | 5.44 |

Inoculum concentration = 3 × 10$^6$ CFU/ml; duration = 10 hr; pH = 8;

Table 7 summarizes biocide activity of a modified surface that includes samples with an input ratio of 30/70 QAS/AzH, 0/70 QAS/AzH and 70/30 QAS/AzH following a challenge with CA-MRSA.

TABLE 7

Antibacterial efficacy of a modified surface that includes samples with different

| Modified PET samples Chlorinated | Chlorine (ppm) ± SD | Available chlorine (ppm) | Contact time (min) | | | |
|---|---|---|---|---|---|---|
| | | | 10 Log Reduction | 20 Log Reduction | 30 Log Reduction | 60 Log Reduction |
| 30/70 QAS/AzH | 183 ± 5 | 1500 | 0.24 | 0.94 | 5.8 | 5.8 |
| 0/70 QAS/AzH | 570 ± 10 | 1500 | 5.8 | 5.8 | 5.8 | 5.8 |
| 70/30 QAS/AzH | 840 ± 5 | 1500 | 5.8 | 5.8 | 5.8 | 5.8 | input ratios of AzH to QAS samples against CA-MRSA.
Inoculum concentration = $5.6 \times 10^6$ CFU/ml; duration = 1 hr; pH = 8;

Table 8 summarizes biocide activity of a modified surface that includes samples with an input ratio of 30/70 QAS/AzH, 50/50 QAS/AzH and 70/30 QAS/AzH following a challenge with MDR-*E. coli*.

TABLE 8

Antibacterial efficacy of a modified surface that includes samples with different input ratios of AzH to QAS samples against MDR-*E.coli*.

| Modified PET samples Chlorinated | Chlorine (ppm) ± SD | Available chlorine (ppm) | Contact time (min) | | | | | |
|---|---|---|---|---|---|---|---|---|
| | | | 3 % reduction | 5 % reduction | 10 % reduction | 10 Log Reduction | 60 % reduction | 60 Log Reduction |
| 30/70 QAS/AzH | 289 ± 14 | 2500 | 14.3 | 53.4 | 100 | 3.64 | 100 | 5.85 |
| 50/50 QAS/AzH | 299 ± 9.6 | 100 | 15.3 | 55.3 | 100 | 5.81 | 100 | 5.85 |
| 70/30 QAS/AzH | 306 ± 9.6 | 120 | 6.1 | 24.3 | 34.1 | 0.18 | 100 | 5.85 |

Table 9 summarizes the concentration of QAS that are immobilized on a modified surface and the corresponding charge density when the modified surface includes samples with varying amounts of QAS.

TABLE 9

QAS Immobilized on a modified surface with respect to varying amounts of QAS on the modified surface.

| Modified PET | 30% QAS | 50% QAS | 70% QAS | 100% QAS |
|---|---|---|---|---|
| Concentration of QAS on PET surface (mmol/cm$^2$) | $4.72 \times 10^{-5}$ | $7.76 \times 10^{-5}$ | $1.15 \times 10^{-4}$ | $1.41 \times 10^{-4}$ |
| % QAS immobilized on the surface | 1.70 | 2.80 | 4.22 | 5.07 |
| Surface charge density (charges/cm$^2$) | $2.85 \times 10^{16}$ | $4.68 \times 10^{16}$ | $6.97 \times 10^{16}$ | $8.47 \times 10^{16}$ |

Table 10 summarizes the ratio of QAS to N-chloramine on a modified surface that includes samples with varying amounts of QAS.

TABLE 10

Ratio of QAS to N-chloramine on a modified surface with varying amounts of QAS surfaces.

| Modified PET | 30% QAS | 50% QAS | 70% QAS | 100% QAS |
|---|---|---|---|---|
| QAS on surface: N-chloramine | 1:2.64 QAS/NH | 1:2.85 QAS/NH | 1:2.3 QAS/NH | 1:1.91 QAS/NH |

All of the data presented in the previous tables were obtained from modified surfaces that were prepared according to the method shown in FIG. 1. These modified surfaces include an acyclic N-halamine precursor group between the PET surface and the Click linkage. These modified surfaces also include the cyclic N-halamine precursor of Formula XIX, shown as AzH.

Table 12 summarizes the amount of chlorine upon a modified surface that includes the samples that have an input ratio of 50/50 QAS/AzH and 0/50 QAS/AzH following a 60 minute exposure to 100 ppm of chlorine.

TABLE 12

Chlorine loading on PET = PA-AzH samples with and without positive charge.

| Modified PET | 50/50 QAS/AzH ± SD | 0/50 QAS/AzH ± SD |
|---|---|---|
| Chlorine (ppm) | 150 ± 19 | 24 ± 14 |

Available chlorine = 100 ppm;
duration = 1 hr;
pH = 8

Table 13 summarizes the concentration of QAS upon a modified surface that includes the samples that have an input ratio of 30/70 QAS/AzH; 50/50 QAS/AzH and 70/30 QAS/AzH.

TABLE 13

Summary of QAS immobilized on the modified surface with respect to total clickable sites.

| Modified PET | 30/70 QAS/AzH | 50/50 QAS/AzH | 70/30a AzH/QAS |
|---|---|---|---|
| Concentration of QAS on PET surface (mmol/cm$^2$) | $1.10 \times 10^{-5}$ | $3.48 \times 10^{-5}$ | $4.52 \times 10^{-4}$ |
| % QAS immobilized on the surface | 0.95 | 2.99 | 3.89 |
| Surface charge density (charges/cm$^2$) | $6.64 \times 10^{16}$ | $2.09 \times 10^{16}$ | $2.72 \times 10^{16}$ |

Table 14 summarizes the calculated ratios of QAS to N-chloramines upon a modified surface with the samples that have an input ratio of 30/70 QAS/AzH; 50/50 QAS/AzH and 70/30 QAS/AzH.

TABLE 14

Ratio of QAS to N-chloramine on PET-PA-AzH/QAS surface.

| Modified PET | 30/70 QAS/AzH | 50/50 QAS/AzH | 70/30 AzH/QAS |
|---|---|---|---|
| QAS on surface: N-chloramine | 0.132:1 QAS/NH | 0.439:1 QAS/NH | 0.531:1 QAS/NH |

Table 15 summarizes the biocide activity of a modified surface that includes the samples that have an input ratio of 30/70 QAS/AzH; 50/50 QAS/AzH and 70/30 QAS/AzH.

TABLE 15

Biocidal activity of a modified surface with samples that include input ratios of 30/70 QAS to AzH, 50/50 QAS to AzH and 70/30 QAS to AzH against MDR-E. coli.

| PMBAA PET samples Chlorinated | Chlorine (ppm) ± SD | Available chlorine (ppm) | Contact time (min) 5 % reduction | 10 % reduction | 10 Log Reduction | 30 % reduction | 30 % reduction |
|---|---|---|---|---|---|---|---|
| 30/70 QAS/AzH | 231 ± 4.9 | 500 | 59 ± 7.7 | 98 ± 1.7 | 1.9 ± 1.7 | 100 | 5.85 |
| 50/50 QAS/AzH | 221 ± 2.4 | 500 | 65 ± 1.4 | 98.7 ± 30 | 1.94 ± 2.4 | 100 | 5.85 |
| 70/30 QAS/AzH | 218 ± 0.7 | 800 | 80 ± 4.2 | 100 ± 0.7 | 5.80 ± 0.7 | 100 | 5.85 |

Figure 2:
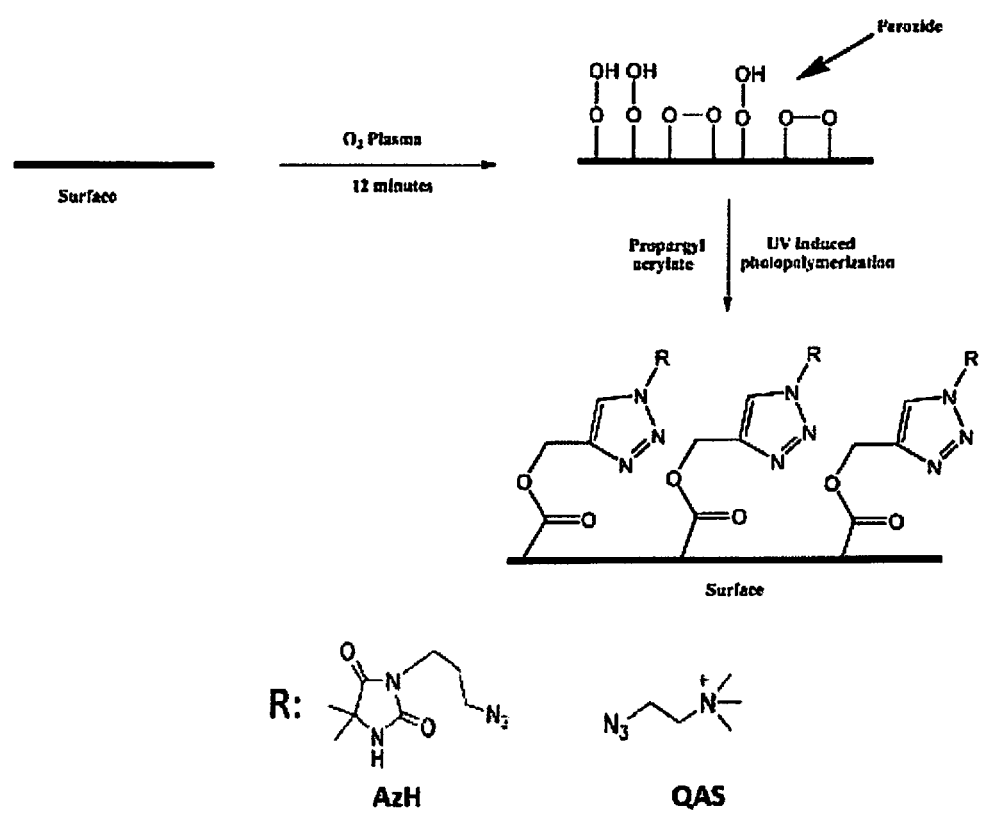
FIG. 2 is a schematic representation of another example of a method for modifying a substrate's surface for connecting at least one cationic center and at least one N-halamine bearing group.
Figure 3:
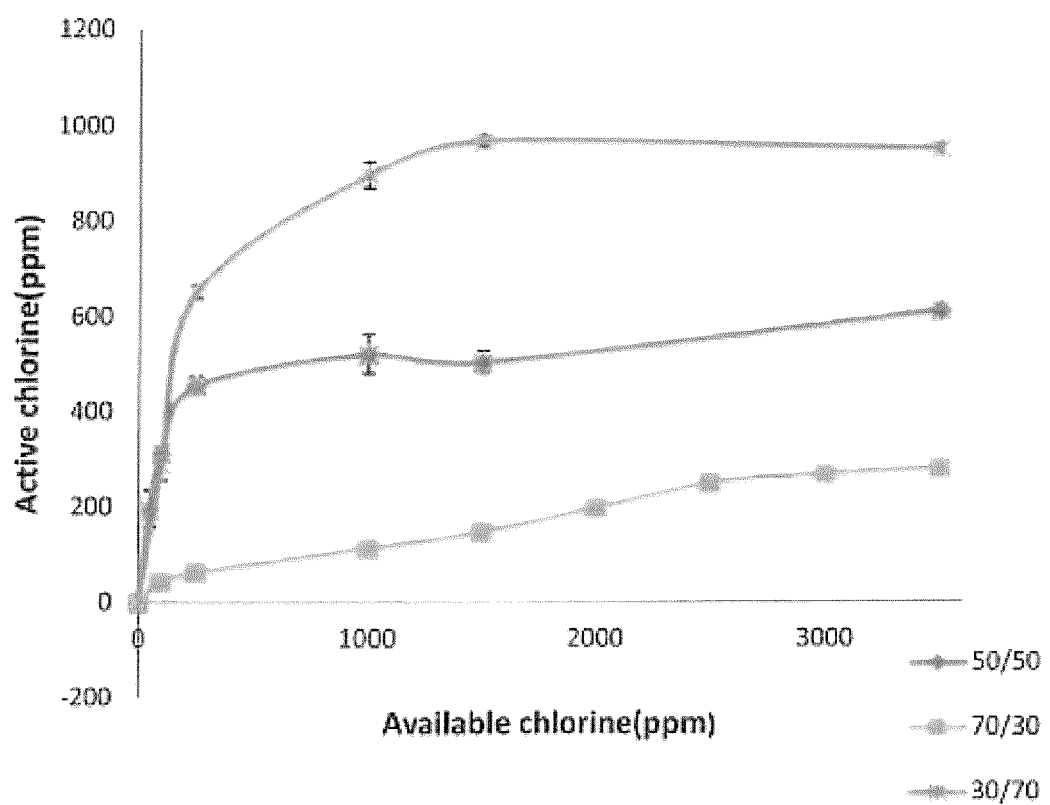
FIG. 3 is a line graph that depicts an example of active, surface chlorine-loading data from three modified surfaces, each with a different input ratio of the number of cationic centers to the number of N-halamine bearing groups.
Figure 4:
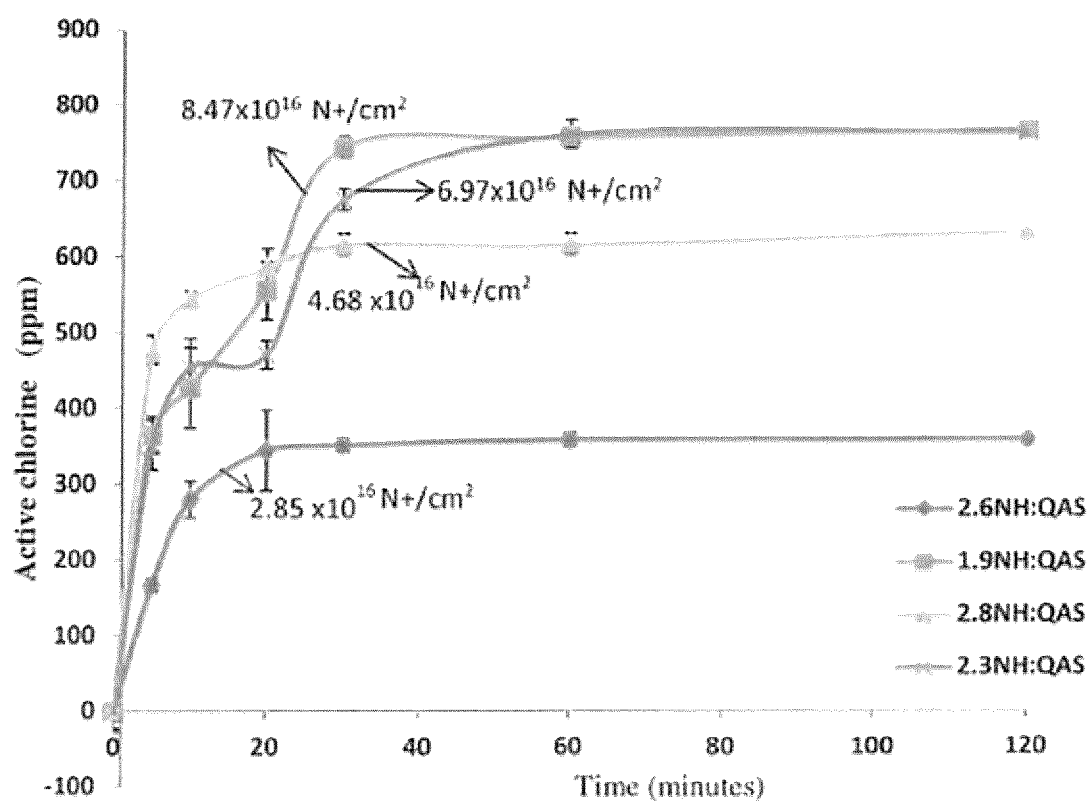
FIG. 4 is a line graph that depicts the active, surface chlorine-loading from four modified surfaces, each with a different input ratio of the number of cationic centers to the number of N-halamine bearing groups, also included are the positive charge densities measured on the surface.
Figure 5:
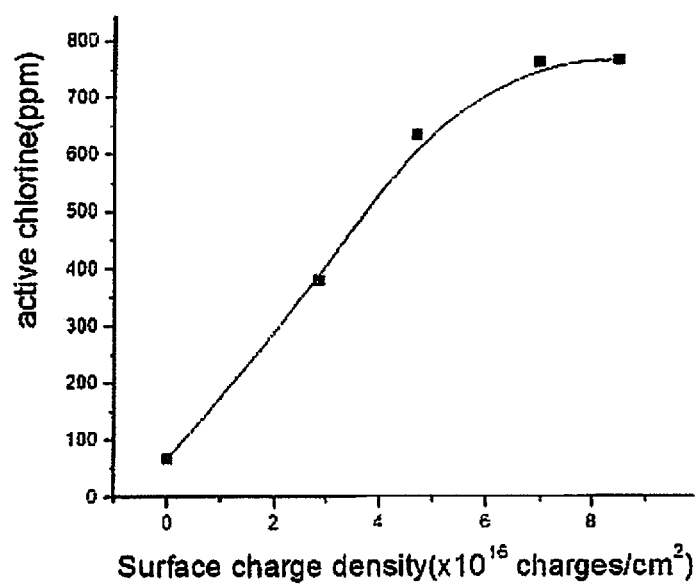
FIG. 5 is a line graph that depicts an example of active, surface chlorine-loading data versus surface charge density.
Figure 6:
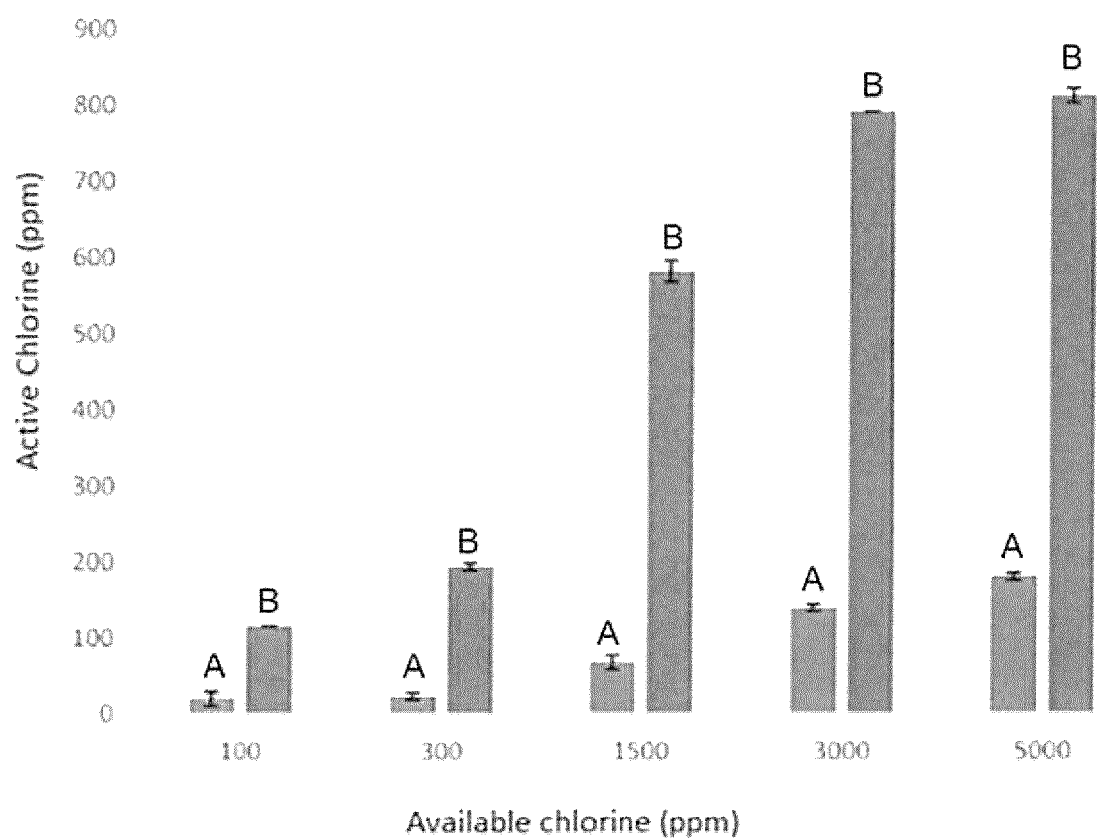
FIG. 6 is a bar graph that depicts an example of active, surface chlorine loading data at various available chlorine levels for a modified surface that has no QAS (A) connected thereto and a modified surface that has 100% QAS (B) connected thereto.
Figure 7:
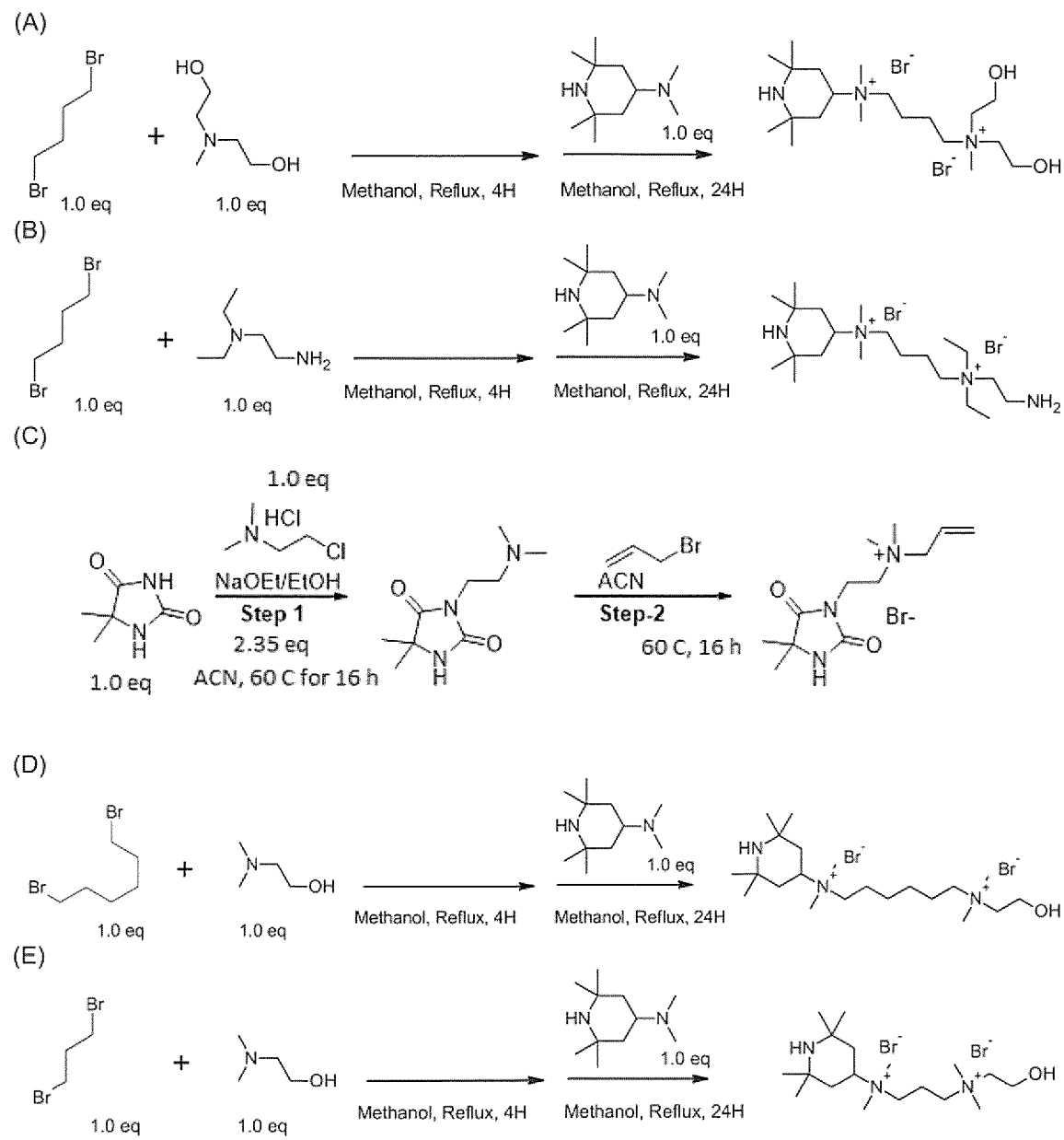
FIGS. 7A, 7B, 7C, 7D and 7E are examples of reaction schemes to synthesis examples of compounds disclosed herein.
Figure 8:
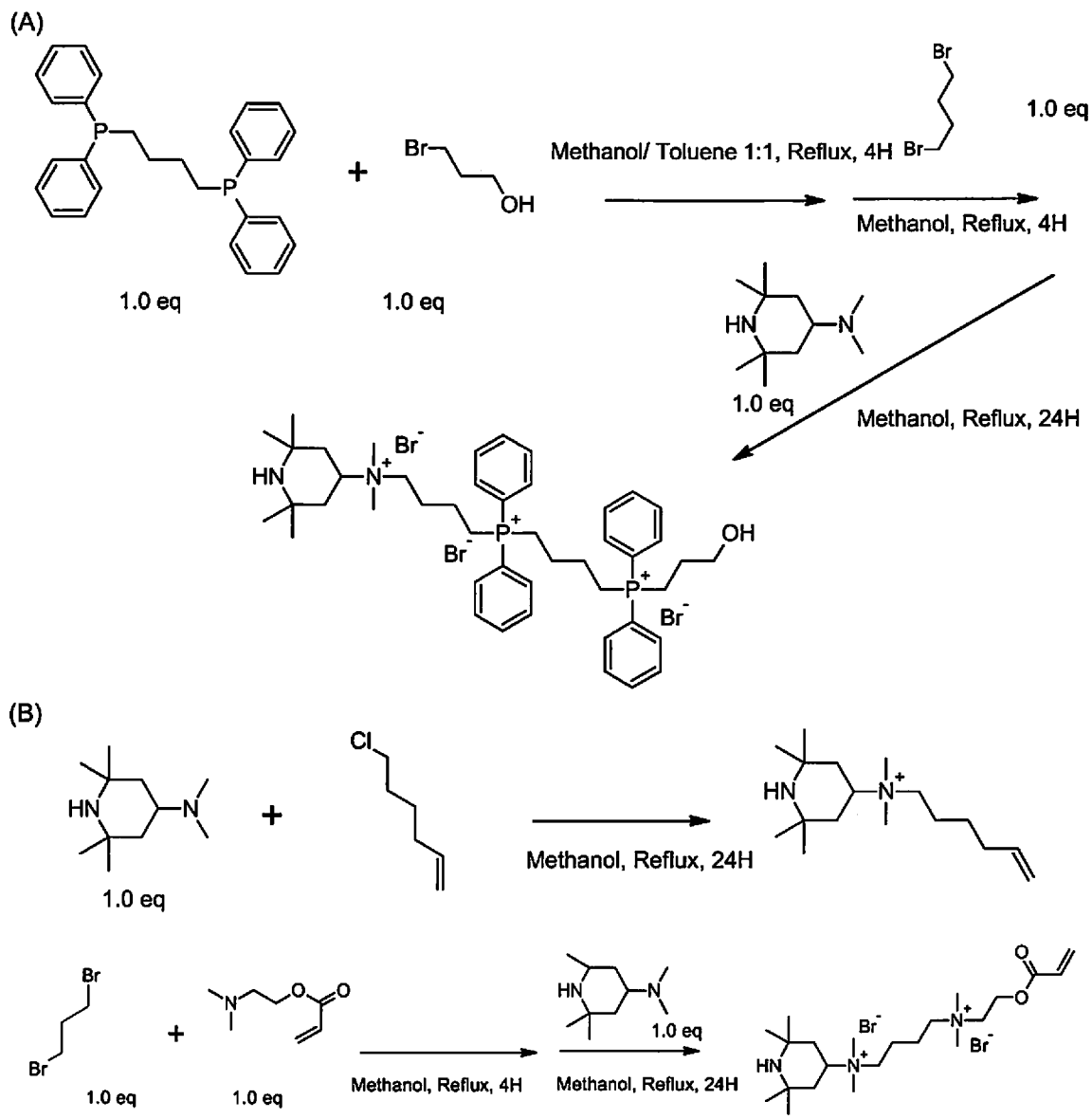
FIGS. 8A and 8B are examples of reaction schemes to synthesis examples of further compounds disclosed herein.
Figure 9:
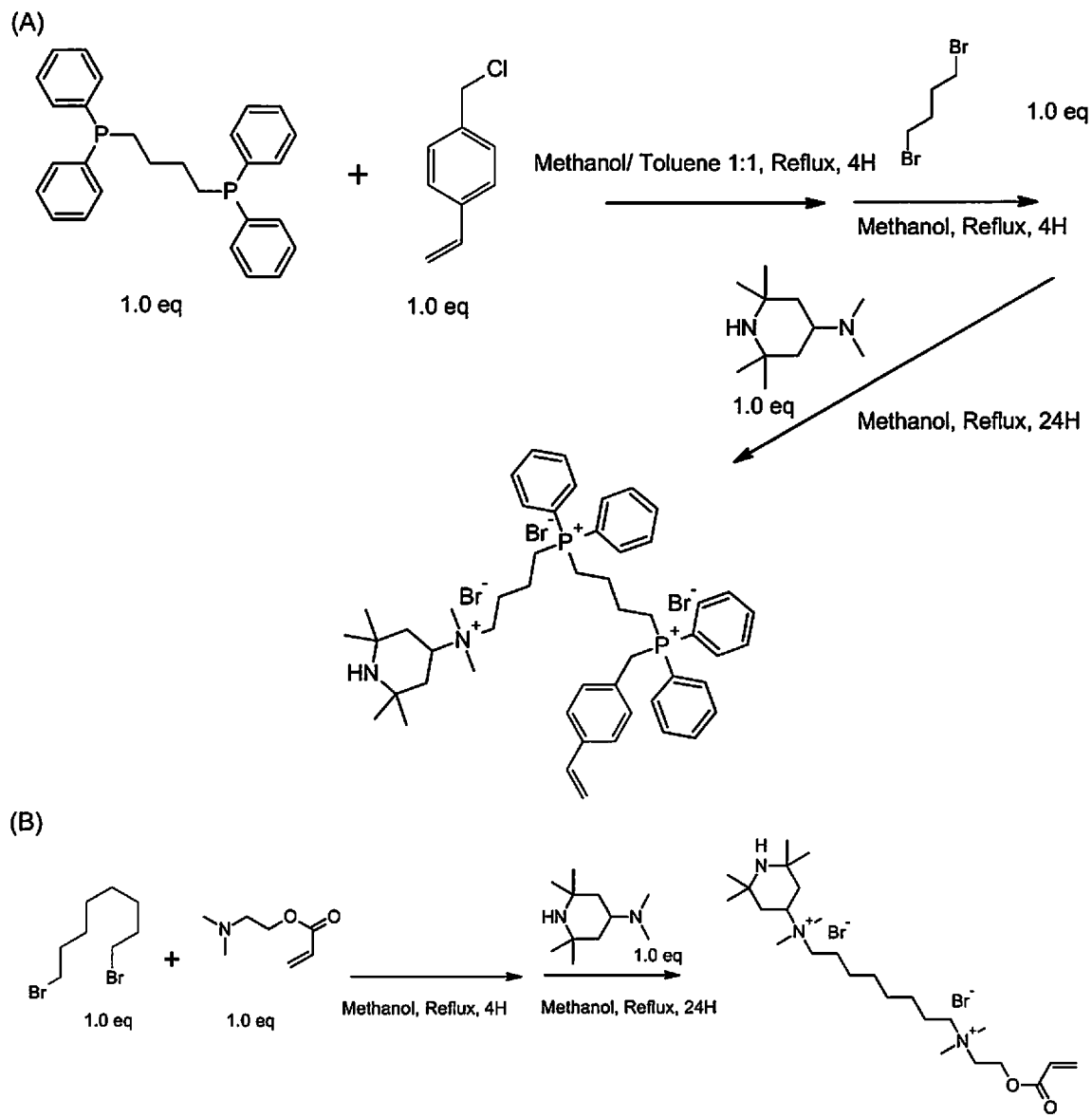
FIGS. 9A and 9B are examples of reaction schemes to synthesis examples of further compounds disclosed herein.
Figure 10:
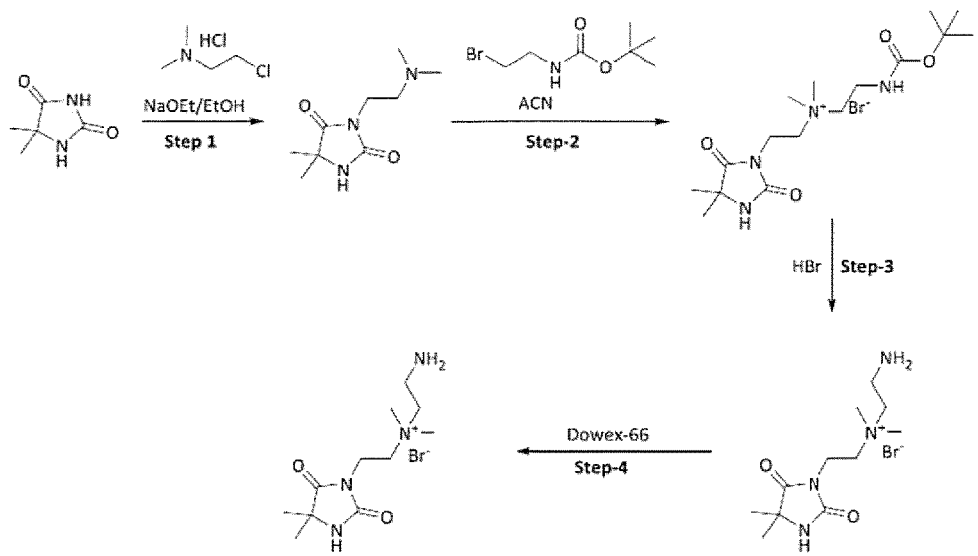
FIGS. 10A, 10B and 10C are examples of reaction schemes to synthesis examples of further compounds disclosed herein.
Figure 10:
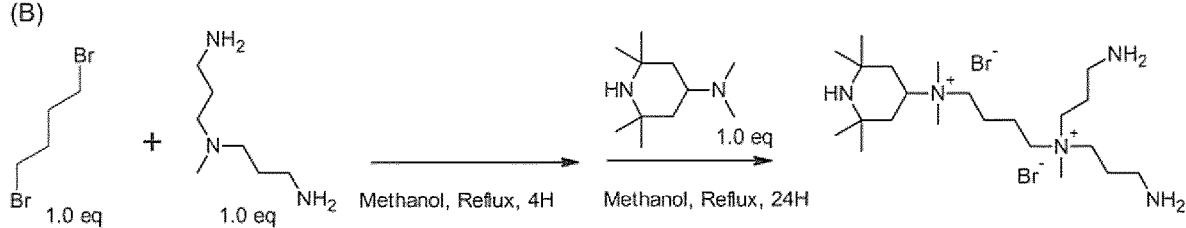
Figure 10:
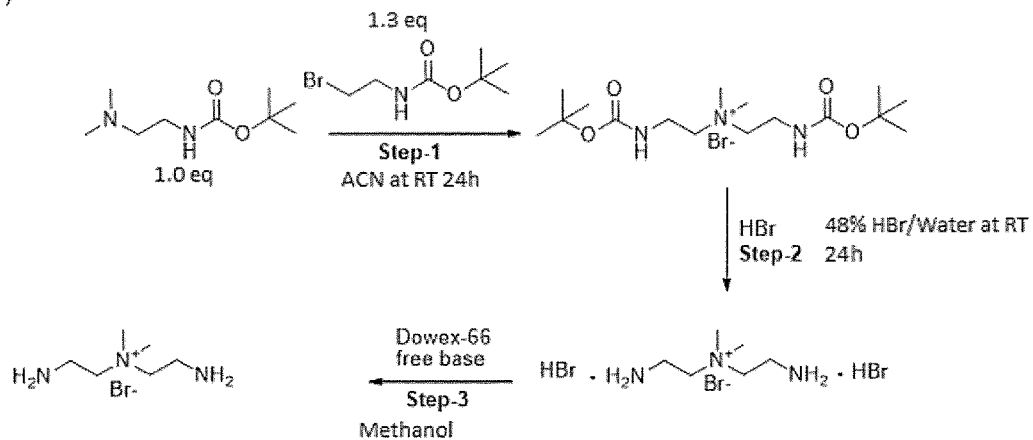
Figure 11:
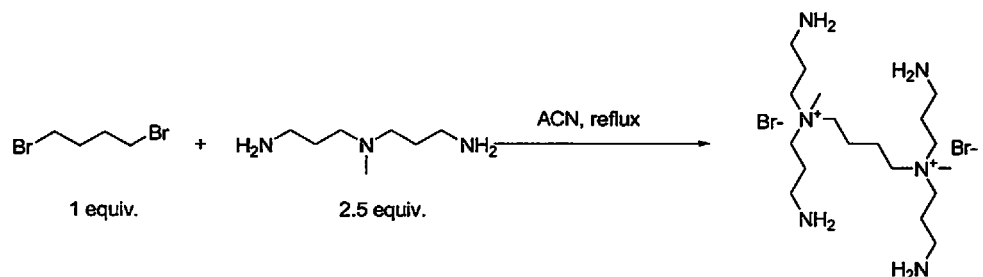
FIGS. 11A and 11B are examples of reaction schemes to synthesis examples of further compounds disclosed herein.
Figure 11:
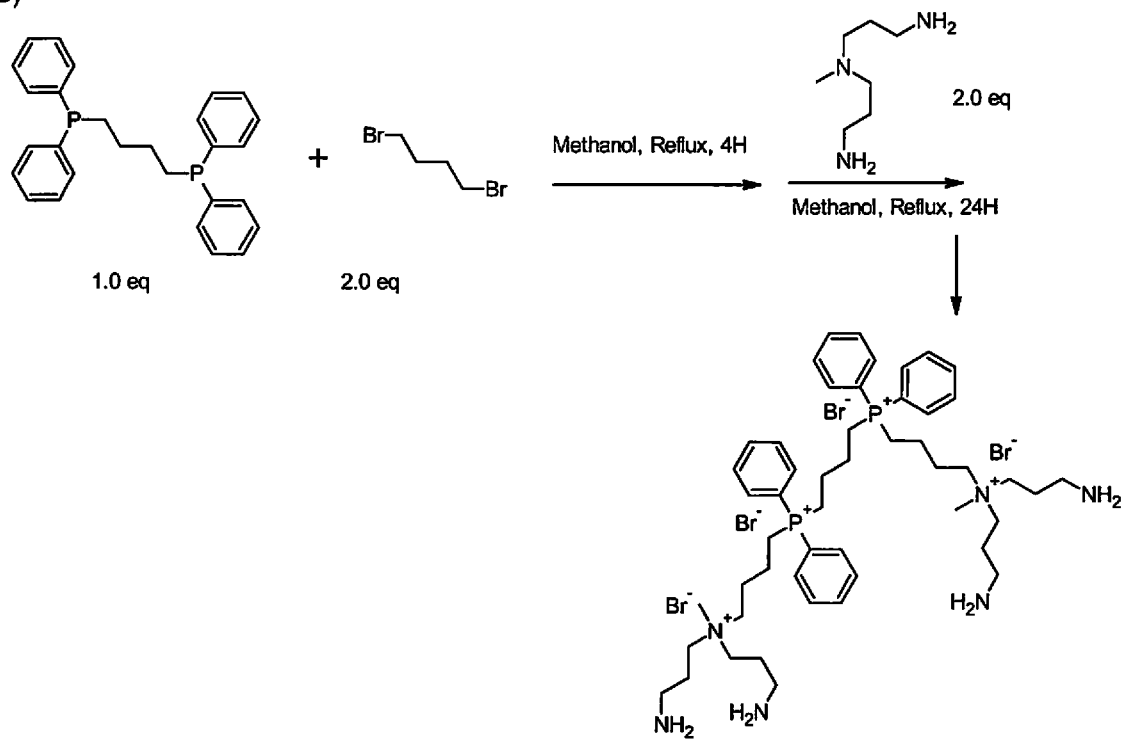
Figure 12:
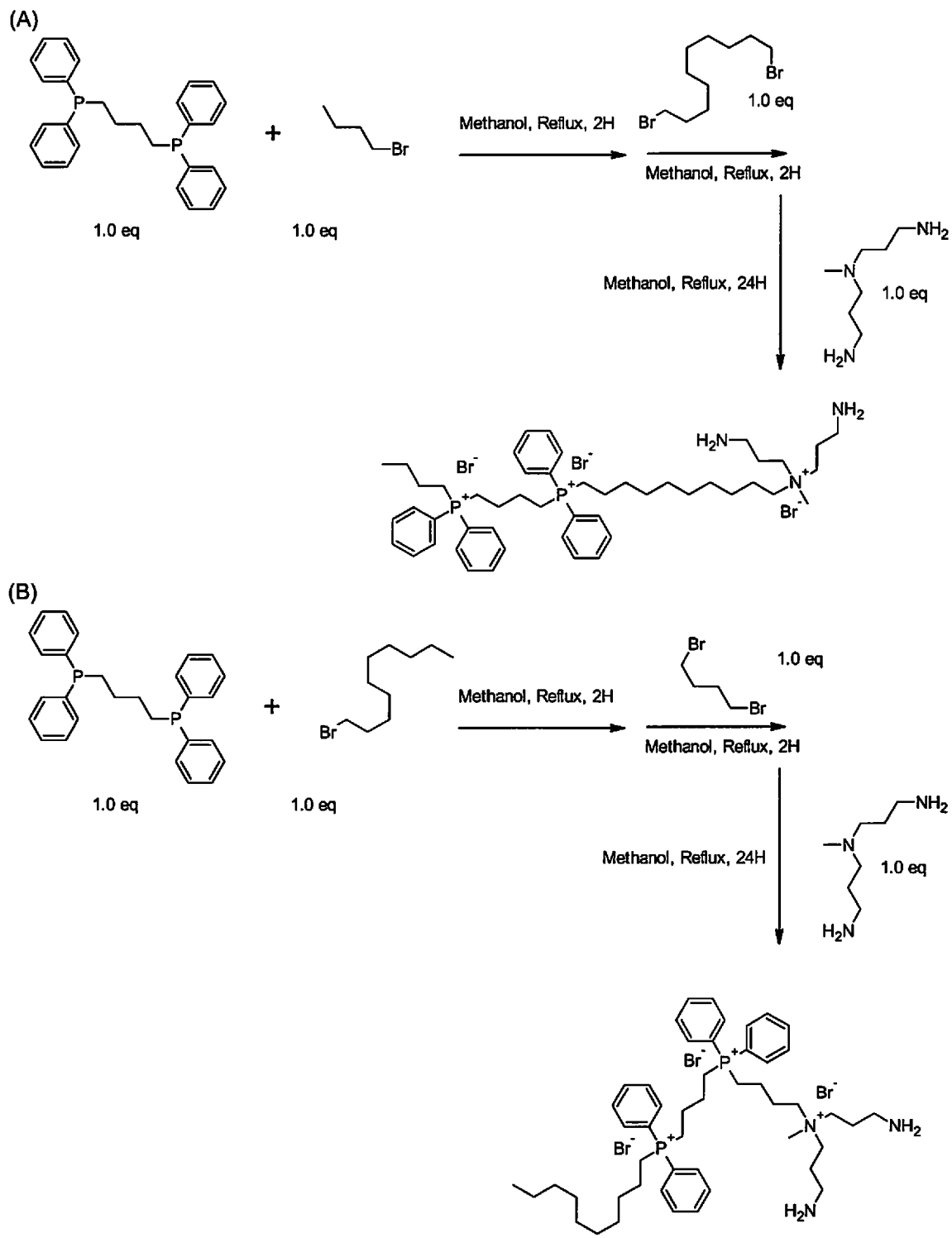
FIGS. 12A and 12B are examples of reaction schemes to synthesis examples of further compounds disclosed herein.
Figure 13:
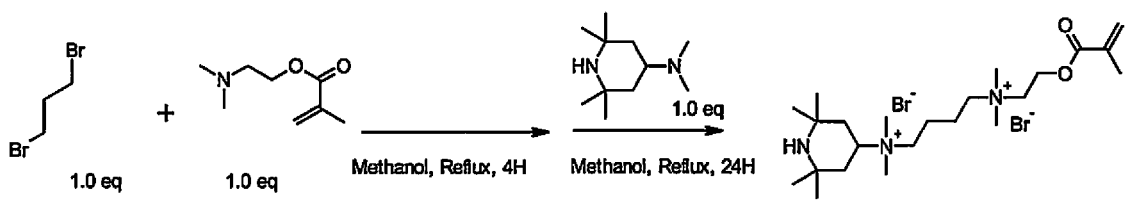
FIG. 13 is an example of a reaction scheme to synthesis examples of a further compound disclosed herein.

Inoculum concentration = 5.7× 106 CFU/ml; duration = 1 hr; pH = 8;

The data presented in the previous Tables 12 to 15 were obtained from modified surfaces that were prepared according to the method shown in FIG. 2. These modified surfaces do not include any acyclic N-halamine groups but they do include the cyclic N-halamine precursors of Formula XIX, shown as AzH and the cationic compound of Formula VIa, shown as QAS.

Soft Substrates—Direct Roll Coating

Further coating formulations were designed for soft substrates. The following further coating formulations may be suitable for coating a textile substrate, such as polycotton. Table 16 below provides a summary of chemical components used in the coating formulations for soft substrates.

TABLE 16

Summary of chemical components used to make soft-substrate coating formulations.

| Product ID | Description |
|---|---|
| Chemical Components | |
| TRIBUILD DX-164 | Water-based emulsion, homopolymer of polyvinyl acetate. |
| TRICOMEL 100 | Water-soluble, modified melamine crosslinker. |
| TRICOSIL ® DMR (TRICOSIL is a registered trademark of Cesare Ragazzi Company) | A silicone-based polymer emulsion. |
| TRIBUILD MB NPF | Modified polyvinyl acetate copolymer latex, contains no alkyl phenol ethoxylates (APEO) |

TABLE 16-continued

Summary of chemical components used to make soft-substrate coating formulations.

| Product ID | Description |
|---|---|
| TRICOFRESH LOC | Modified self-catalyzed imidazolidinone, with low levels of fromaldehyde |
| PERMAFRESH ® 600 (PERMAFRESH is a registered trademark of the Sun Corporation) | Dimethylol dihydroxyl ethyleneurea solution (DMDHEU) |
| | Chemical |
| Catalyst 531 | Aqueous magnesium chloride solution. Solution is a pH of 1. |
| RayCryl 1853 | High solids acrylic emulsion polymer. Self crosslinking and carboxyl group. APEO free and anionic. |
| Matrix | |
| F2 | Tribuild DX-164 and Tricomel 100 |
| F14 | Permafresh 600 and Catalyst 531 |

Table 16.1 provides the mass and % of total mass for the chemical components used to produce the Coating Formulation 1.

TABLE 16.1

Chemical components used to produce the Coating Formulation 1.

| COATING FORMULATION 1 | 7409WOB-F2D2P1-1 | | Mass | % |
|---|---|---|---|---|
| A | DEPA [Formula VIII] | g | 0.90 | 0.93 |
| B | H2O | g | 79.30 | 81.58 |
| C | TRIBUILD DX-164 (48% solids) | g | 10.00 | 10.29 |
| C | TRICOMEL 100 (41% solids) | g | 7.00 | 7.20 |
| | TOTAL | g | 97 | 100 |

Table 17 provides the mass and % of total mass for the chemical components used to produce a Coating Formulation 2.

TABLE 17

Chemical components used to produce the Coating Formulation 2.

| COATING FORMULATION 2 | 7409WOB-F2PVP1-1 | | Mass | % |
|---|---|---|---|---|
| A | PIP—C4-VINYL [Formula XII] | g | 0.85 | 0.87 |
| B | H2O | g | 79.30 | 81.63 |
| C | TRIBUILD DX-164 (48% solids) | g | 10.00 | 10.29 |
| C | TRICOMEL 100 (41% solids) | g | 7.00 | 7.21 |
| | TOTAL | g | 97 | 100 |

Table 18 provides the mass and % of total mass for the chemical components used to produce a Coating Formulation 3.

TABLE 18

Chemical components used to produce the Coating Formulation 3.

| COATING FORMULATION 3 | 7409WOB-F2VAP05-1 | | Mass | % |
|---|---|---|---|---|
| A | PIP—C4—C2-VINYL-ACETATE [Formula XIII] | g | 0.53 | 0.55 |
| B | H2O | g | 79.30 | 81.90 |
| C | TRIBUILD DX-164 (48% solids) | g | 10.00 | 10.33 |
| C | TRICOMEL 100 (41% solids) | g | 7.00 | 7.23 |
| | TOTAL | g | 97 | 100 |

Table 19 provides the mass and % of total mass for the chemical components used to produce a Coating Formulation 4.

TABLE 19

Chemical components used to produce the Coating Formulation 4.

| COATING FORMULATION 4 | 7409WOB-F14POP1-1 | | Mass | % |
|---|---|---|---|---|
| A | PIP—C6—C2—OH [Formula IX] | g | 1.44 | 1.44 |
| B | H2O | g | 90.59 | 90.60 |
| C | TRIBUILD DX-164 (48% solids) | g | 5.47 | 5.47 |
| C | TRICOMEL 100 (41% solids) | g | 2.49 | 2.49 |
| | TOTAL | g | 100 | 100 |

Table 20 provides the mass and % of total mass for the chemical components used to produce a Coating Formulation 5.

TABLE 20

Chemical components used to produce the Coating Formulation 5.

| COATING FORMULATION 5 | 7409WOB-F14PO3P1 | | Mass | % |
|---|---|---|---|---|
| A | PIP—C3—C2—OH [Formula X] | g | 1.33 | 1.33 |
| B | H2O | g | 90.59 | 90.70 |
| C | Permafresh 600 | g | 5.48 | 5.48 |
| C | Catalyst 531 | g | 2.49 | 2.49 |
| | TOTAL | g | 100 | 100 |

Table 21 provides the mass and % of total mass for the chemical components used to produce a Coating Formulation 6.

TABLE 21

Chemical components used to produce the Coating Formulation 6.

| COATING FORMULATION 6 | 7409WOB-F14PHP2 | | Mass | % |
|---|---|---|---|---|
| A | PIP—C4—PPh—C4—PPh—C3—OH [Formula XI] | g | 2.27 | 2.27 |
| B | H2O | g | 89.83 | 89.83 |
| C | Permafresh 600 | g | 5.43 | 5.43 |
| C | Catalyst 531 | g | 2.47 | 2.47 |
| | TOTAL | g | 100 | 100 |

Table 23 provides the mass and % of total mass for the chemical components used to produce a Coating Formulation 8.

TABLE 23

Chemical components used to produce the Coating Formulation 8.

| COATING FORMULATION 8 | 7409WOB-F2B1P3 | | Mass | % |
|---|---|---|---|---|
| A | PIP—C4—PPh—C4—PPh-Benzyl Vinyl [Formula XIV] | g | 2.78 | 2.82 |
| A | Butyl carbitol | g | 22.50 | 22.78 |
| B | DOWANOL ® (DOWANOL is a registered trade-mark of the Dow Chemical Company) | g | 13.50 | 13.67 |
| C | H2O | g | 43.00 | 43.53 |
| D | Tribuild DX-164 (PVAc) | g | 10.00 | 10.12 |
| E | Tricomel | g | 7.00 | 7.09 |
| | TOTAL | g | 99 | 100 |

Table 24 provides the mass and % of total mass for the chemical components used to produce a Coating Formulation 9.

TABLE 24

Chemical components used to produce the Coating Formulation 9.

| COATING FORMULATION 9 | 7409WOB-F2V3P2 | | Mass | % |
|---|---|---|---|---|
| A | PIP—C8—C2—VA [Formula XV] | g | 1.63 | 1.66 |
| C | H2O | g | 79.40 | 81.00 |
| D | Tribuild DX-164 (PVAc) | g | 10.00 | 10.20 |
| E | Tricomel | g | 7.00 | 7.14 |
| | TOTAL | g | 98 | 100 |

Table 24.1 provides the chlorine titration results of virgin textile substrate exposed to 100 ppm for 60 mins.

TABLE 25

Chlorine Titration results of virgin textile substrate.

| Sample Set | Treated Chlorine (ppm) | Shaking Time (min) | Control Value (ml) | Consumed Iodine I2 (ml) | Active Chlorine (ppm) |
|---|---|---|---|---|---|
| 7409CFT_ Untreated | 100 | 60 | 25.5 | 25.4 | 7.0343254 |
| | 100 | 60 | 25.5 | 25.4 | 7.1362721 |
| | 100 | 60 | 25.5 | 25.5 | 0 |
| Average | | | 4.7235325 | | |
| Standard Deviation | | | 4.0910167 | | |

Table 25 provides the chlorine titration results. Coated samples are chlorinated at 100 ppm and shaken for five minutes.

TABLE 25

Chlorine Titration results at 5 minutes.
Summary of Results

| Formulation | SAMPLE ID | Active Chlorine (PPM) | Standard Deviation |
|---|---|---|---|
| 2 | 7409WOB-F2PVP1-1 | 84 | 5 |
| 3 | 7409WOB-F2VAP05-1 | 266 | 9 |
| 1 | 7409WOB-F2D2P1-1 | 189 | 10 |

Table 26 provides the chlorine titration results. Coated samples are chlorinated at 100 ppm and shaken for one hour.

TABLE 26

Chlorine Titration results after 1 hour.
Summary of Results

| Formulation | SAMPLE ID | Active Chlorine (PPM) | Standard Deviation |
|---|---|---|---|
| 2 | 7409WOB-F2PVP1-1 | 206 | 18 |
| 3 | 7409WOB-F2VAP05-1 | 451 | 17 |

Table 28 represents surfaces exposed to gram positive MRSA 40065 bacteria over various contact times. The unchlorinated samples were kept in 37° C. in an incubator for 24 hours. The test method used was modified AATC 100 in 5% TBS.

TABLE 28

Biocidal activity data from a modified surface that includes the Coating Formulations 1, 2 and 3.

| Coating Formulation | SAMPLE ID | Biocidal activity at various contact times (min) | | | | |
|---|---|---|---|---|---|---|
| | | $Log_{10}$ 5 | $Log_{10}$ 10 | $Log_{10}$ 20 | $Log_{10}$ 30 | $Log_{10}$ 60 |
| 2 | 7409WOB-F2PVP1-1 | −0.44 | 0.37 | 2.43 | 6.34 | 6.34 |
| 1 | 7409WOB-F2D2P1-1 | 0.11 | 0.58 | 1.84 | 6.34 | 6.34 |
| 3 | 7409WOB-F2VAP05-1 | −0.22 | 0.68 | 6.34 | 6.34 | 6.34 |

| | Unchlorinated Samples | Biocidal activity at various contact times (hrs) | | |
|---|---|---|---|---|
| | | 1 | 5 | 24 [3] |
| 2 | 7409WOB-F2PVP1-1 | 1.05 | 6.34 | 6.34 |
| 1 | 7409WOB-F2D2P1-1 | 0.19 | 6.34 | 6.34 |
| 3 | 7409WOB-F2VAP05-1 | 2.19 | 6.34 | 6.34 |

Table 29 provides the chlorine titration results. Coated samples are chlorinated at 100 ppm and shaken for one hour.

TABLE 29

Chlorine Titration results after 1 hour. Summary of Results

| Coating Formulation | SAMPLE ID | Active Chlorine (PPM) | Standard Deviation |
|---|---|---|---|
| 4 | 7409WOB-F14POP1-5 | 82 | 14 |
| 5 | 7409WOB-F14PO3P1-1 | 95 | 13 |
| 6 | 7409WOB-F14PHP2-1 | 167 | 49 |
| 1 | 7409WOB-F2D2P1 -6 | 296 | 33 |

Table 30 represents surfaces exposed to gram positive MRSA 40065 bacteria over various contact times. The unchlorinated samples were kept in 37° C. in an incubator for 24 hours. The test method used was modified AATC 100 in 5% TBS.

TABLE 30

Biocidal activity results.

| Formulation | SAMPLE ID | Biocidal activity at various contact times (min) | | | | |
|---|---|---|---|---|---|---|
| | | $Log_{10}$ 0 | $Log_{10}$ 10 | $Log_{10}$ 20 | $Log_{10}$ 30 | $Log_{10}$ 60 |
| 4 | 7409WOB-F14POP1-5 | / | 1.08 | 1.38 | 1.55 | 1.27 |
| 5 | 7409WOB-F14PO3P1-1 | / | 1.05 | 1.14 | 1.35 | 1.18 |
| 6 | 7409WOB-F14PHP2-1 | / | 2.65 | 2.71 | 2.77 | 6.55 |

| | Unchlorinated Samples | Biocidal activity at various contact times (hrs) | |
|---|---|---|---|
| | | 1 | 5 |
| 4 | 7409WOB-F14POP1-5 | 0.86 | 6.55 |
| 5 | 7409WOB-F14PO3P1-1 | 0.88 | 3.15 |
| 6 | 7409WOB-F14PHP2-1 | 3.07 | 6.55 |

Table 31 provides the chlorine titration results. Coated samples are chlorinated at 100 ppm and shaken for one hour.

TABLE 31

Chlorine Titration results after 1 hour.

| Formulation | Sample | Active Chlorine | STD |
|---|---|---|---|
| 7 | F2V2P1-1 | 201 | 4 |
| 8 | F2B1P3-2 | 191 | 17 |
| 9 | F2V3P2-1 | 142 | 15 |

Table 32 provides the surface charge density for the formulation 8.

TABLE 32

Surface charge density results.

| Formulation | Sample | Charge Density ($N+/cm^2$) | STD |
|---|---|---|---|
| 8 | F2B1P3-1 | 6.02E+15 | 5.61E+14 |

Table 33 represents surfaces exposed to gram positive MRSA 40065 bacteria over various contact times. The unchlorinated samples were kept in 37° C. in an incubator for 24 hours. The test method used was modified MRSA in 5% TBS.

TABLE 33

Biocidal activity results.

| | | Log Reduction at Various Contact Times (min) MRSA Inoculum 6.34-log | | |
|---|---|---|---|---|
| Formulation | Sample ID | 10 | 30 | 60 |
| 7 | Unchlorinated F2V2P1-1 | 0.44 | 0.65 | 1.02 |
| 7 | Chlorinated F2V2P1-1 | 6.34 | 6.34 | 6.34 |
| 8 | Unchlorinated F2B1P3-1 | 0.69 | 6.34 | 6.34 |
| 8 | Chlorinated F2B1P3-1 | 6.34 | 6.34 | 6.34 |
| 9 | Unchlorinated F2V3P2-1 | 0.47 | 0.53 | 0.47 |
| 9 | Chlorinated F2V3P2-1 | 6.34 | 6.34 | 6.34 |

Table 34 represents formulation 7 of the logarithmic Biocidal activity of gram positive CA-MRSA 40065 bacteria at various contact times. The unchlorinated samples were kept in 37° C. in an incubator for 24 hours. The test method used was modified MRSA in 5% TBS.

TABLE 34

Biocidal activity results in de-ionized water.

| Formulation 7 Sample ID F2V2P1 | Log Reduction at Various Contact Times (min) MRSA Incolum | | |
|---|---|---|---|
| | 10 min | 30 min | 60 min |
| Unchlorinated: | 0.44 | 0.65 | 1.02 |
| Chlorinated | 6.34 | 6.34 | 6.34 |

Table 35 represents formulation 8 surfaces exposed to gram positive MRSA 40065 bacteria over various contact times. The unchlorinated samples were kept in 37° C. in an incubator for 24 hours. The test method used was modified MRSA in 5% TBS.

TABLE 35

Biocidal activity results in de-ionized water.

| Formulation 8 Sample ID F2B1P3 | Log Reduction at Various Contact Times (min) MRSA Incolum | | |
|---|---|---|---|
| | 10 min | 30 min | 60 min |
| Unchlorinated | 0.69 | 6.34 | 6.34 |
| Chlorinated | 6.34 | 6.34 | 6.34 |

Table 36 represents formulation 9 surfaces exposed to gram positive MRSA 40065 bacteria over various contact times. The unchlorinated samples were kept in 37° C. in an incubator for 24 hours. The test method used was modified MRSA in 5% TBS.

TABLE 36

Biocidal activity results in de-ionized water.

| Formulation 9 Sample ID F2V3P2 | Log Reduction at Various Contact Times (min) MRSA Incolum | | |
|---|---|---|---|
| | 10 min | 30 min | 60 min |
| Unchlorinated | 0.47 | 0.53 | 0.47 |
| Chlorinated | 6.34 | 6.34 | 6.34 |

Hard Surfaces—Direct Roll Coating

Hard-surface coating formulations were designed that each comprise at least one N-halamine bearing compound and a cationic center. These further coating compounds may be suitable for coating hard substrates, such as hard polymers, metals and metal alloys.

Table 37 summarizes the chemical components used to make the hard-surface coating formulations.

TABLE 37

Chemical components for hard-surface coating formulations.

| Chemical Components | |
|---|---|
| BECKOPDX ® EP 2384W/57WA | Type 1 solid epoxy resin as an aqueous dispersion. |
| BECKOCURE EH 2260/41WA | Aliphatic polyamine adduct. Suited for anticorrosion coatings. |
| ANCAREZ AR555 | Solid epoxy dispersion stabilized in water with a nonionic surfactant. |
| ANQUAWHITE 100 | Amine functional polymer dispersed in water and propylene glycol methyl ether |

TABLE 37-continued

Chemical components for hard-surface coating formulations.

Additives

| | |
|---|---|
| DOWANOL ® PPh | Propylene glycol phenyl ether. Slow-evaporating, hydrophobic coalescent. |
| BUTYL CARBYTOL | Diethylene glycol monobutyl ether. Slow-evaporating hydrophilic coalescent. |
| TRICOSIL ® DMR | Amino functional silicone and emulsifier. Mildly cationic. |
| ADDITOL ® (ADDITOL is a registered trade-mark of the Allnex Germany GmbH) XW 390 | Flow and wetting agent without silicone. |
| CATIONIC DETA | Cationic hardener [Formula II] |
| ADDITOL ® VXW 6374 | Ionic and nonionic surfactant with pigment affinity groups for organic and inorganic pigments. Wetting agent for neutral as well as amine neutralized waterborne coatings systems. |
| QAS/QPS Tetramine | Quaternary ammonium(QAS), quaternary phosphonium (QPS) hardener |

Matrix Formula [IV]

| | |
|---|---|
| E3 | BECKOPDX ® EP 2384w/57WA and Cationic DETA |
| E4 | Beckocure EH 2260w/41WA, BECKOPDX ® EP 2384w/57WA, and Cationic DETA |
| E9 | BECKOPDX ® EP 2384W/57WA |
| E11 | BECKOPDX ® EP 2384w/57WA + QAS/QPS Tertamine |

Substrate

| | |
|---|---|
| NN | Nylon 66 plastic |
| SS | Stainless Steel 304 |

Table 37.1 provides the mass and % of total mass for the chemical components used to produce a Coating Formulation 10.

TABLE 37.1

Chemical components used to produce the Coating Formulation 10.

| Formulation 10 | E3A1P7-1&2 (NN and SS substrates) Mass (g) | | |
|---|---|---|---|
| | Theoretical | Practical | % |
| BECKOPOX ® EP 2384W/57WA | 75 | 54.32 | 76.82 |
| CATIONIC DETA (60%) [Formula II] | 100 | 2.52 | 3.56 |
| DI WATER | 12 | 6.96 | 9.84 |
| DOWANOL ® PPH | | 1.74 | 2.46 |
| ATH (40%) [Formula XVI] | | 5.17 | 7.31 |
| Total: | 187 | 70.7 | 100 |

Table 38 provides the mass and % of total mass for the chemical components used to produce a Coating Formulation 11. The ratio of the positive charge to the hydantoin in this formulation is 1.12:1.

TABLE 38

Chemical components used to produce the Coating Formulation 11.

| Formulation 11 | NN-E3A1P11-1&2 Mass (g) | | |
|---|---|---|---|
| | Theoretical | Practical | % |
| BECKOPOX ® EP 2384W/57WA | 75.00 | 34.10 | 68.21 |
| CATIONIC DETA (20%) [Formula II] | 1.06 | 0.48 | 0.96 |
| ATH (80%) [Formula XVI] | 12.93 | 5.88 | 11.76 |
| DI WATER | 20.97 | 9.54 | 19.07 |
| Total: | 109.96 | 50 | 100.00 |

Table 39 provides the mass and % of total mass for the chemical components used to produce a Coating Formulation 12. The ratio of the positive charge to the hydantoin in this formulation is 1.574:1.

TABLE 39

Chemical components used to produce the Coating Formulation 12.

| Formulation 12 | NN-E3A1P11-3&4 Mass (g) | | |
|---|---|---|---|
| | Theoretical | Practical | % |
| BECKOPDX ® EP 2384W/57WA | 75.00 | 30.69 | 61.38 |
| CATIONIC DETA (20%) [Formula II] | 1.06 | 0.43 | 0.87 |
| ATH (80%) [Formula XVI] | 12.93 | 5.29 | 10.58 |
| DI WATER | 21 | 8.58 | 17.16 |
| ADDITOL ® VXW 6374 | 12.22 | 5.00 | 10.00 |
| Total: | 122.18 | 50 | 100.00 |

Table 40 provides the mass and % of total mass for the chemical components used to produce a Coating Formulation 13. The ratio of the positive charge to the hydantoin in this formulation is 1.1249:1.

TABLE 40

Chemical components used to produce the Coating Formulation 13.

| Formulation 13 | NN-E3A1P11-5&6 | Mass (g) Theoretical | Practical | % |
|---|---|---|---|---|
| BECKOPOX ® EP 2384W/57WA | | 75.00 | 33.76 | 67.52 |
| CATIONIC DETA (20%) [Formula II] | | 1.06 | 0.48 | 0.95 |
| ATH (80%) [Formula XVI] | | 12.93 | 5.82 | 11.64 |
| DI WATER | | 21 | 9.44 | 18.88 |
| ADDITOL ® XW 390 | | 1.11 | 0.50 | 1.00 |
| Total: | | 111.07 | 50 | 100.00 |

Table 41 provides the mass and % of total mass for the chemical components used to produce a Coating Formulation 14. The ratio of the positive charge to the hydantoin in this formulation is 1.4994:1.

TABLE 41

Chemical components used to produce the Coating Formulation 14.

| Formulation 14 | NN-E3A1P8-1&2 | Mass (g) Theoretical | Practical | % |
|---|---|---|---|---|
| BECKOPOX ® EP 2384W/57WA | | 75.00 | 36.46 | 72.92 |
| CATIONIC DETA (50%) [Formula II] | | 2.65 | 1.29 | 2.58 |
| ATH (50%) [Formula XVI] | | 8.08 | 3.93 | 7.86 |
| DI WATER | | 16.10 | 7.83 | 15.65 |
| ADDITOL ® XW 390 | | 1.02 | 0.50 | 0.99 |
| Total: | | 102.85 | 50 | 100.00 |

Table 42 provides the mass and % of total mass for the chemical components used to produce a Coating Formulation 15. The ratio of the positive charge to the hydantoin in this formulation is 2.9988:1.

TABLE 42

Chemical components used to produce the Coating Formulation 15.

| Formulation 15 | NN-E3A1P3-1&2 | Mass (g) Theoretical | Practical | % |
|---|---|---|---|---|
| BECKOPOX ® EP 2384W/57WA | | 75.00 | 39.63 | 79.26 |
| Cationic HARDENER (80%) | | 4.24 | 2.24 | 4.48 |
| ATH (20%) [Formula XVI] | | 3.23 | 1.71 | 3.41 |
| DI WATER | | 11.21 | 5.92 | 11.85 |
| ADDITOL ® XW 390 | | 0.95 | 0.50 | 1.00 |
| Total: | | 94.63 | 50 | 100.00 |

Table 43 provides the mass and % of total mass for the chemical components used to produce a Coating Formulation 16. The ratio of the positive charge to the hydantoin in this formulation is 1.2507:1.

TABLE 43

Chemical components used to produce the Coating Formulation 16.

| Formulation 16 | NN-E4A1P7-1&2 | Mass (g) Theoretical | Practical | % |
|---|---|---|---|---|
| BECKOPOX ® EP 2384W/57WA | | 75.00 | 30.55 | 61.09 |
| BECKOPOX ® EH 2260/41WA (25%) | | 25.00 | 10.18 | 20.36 |
| Cationic Hardener (25%) | | 1.33 | 0.54 | 1.08 |
| ATH (50%) [Formula XVI] | | 8.08 | 3.29 | 6.58 |
| DI WATER | | 12.12 | 4.94 | 9.87 |
| ADDITOL ® XW 390 | | 1.23 | 0.50 | 1.00 |
| Total: | | 122.76 | 50 | 100.00 |

Table 44 provides the mass and % of total mass for the chemical components used to produce a Coating Formulation 17. The ratio of the positive charge to the hydantoin in this formulation is 2:1.

TABLE 44

Chemical components used to produce the Coating Formulation 17.

| Formulation 17 | GS-E9PDP15-5&6 | Mass (g) Theoretical | Practical | % Before curing | % After curing |
|---|---|---|---|---|---|
| BECKOPOCK EP 2384/57W | | 100.00 | 21.70 | 72.33 | 84.61 |
| PIP-C4-BIS-C3-NH2 [Formula XVII] | | 18.18 | 3.95 | 13.15 | 15.39 |
| Water | | 18.00 | 3.91 | 13.02 | |
| DMP ® (DMP is a registered trademark of Air Products and Chemicals, Inc.) 30 | | 2.07 | 0.45 | 1.50 | |
| Total: | | 138.25 | 30.00 | 100.00 | 100.00 |

Table 45 provides the mass and % of total mass for the chemical components used to produce a Coating Formulation 18. The ratio of the positive charge to the hydantoin in this formulation is 2:1.

TABLE 45

Chemical components used to produce the Coating Formulation 18.

| Formulation 18 | GS-E9PDP15-9&10 | Mass (g) Theoretical | Practical | % Before curing | % After curing |
|---|---|---|---|---|---|
| BECKOPOCK EP 2384/57W | | 100.00 | 21.70 | 72.33 | 84.61 |
| PIP-C4-BIS-C3-NH2 [Formula XVII] | | 18.18 | 3.95 | 13.15 | 15.39 |
| Water | | 18.00 | 3.91 | 13.02 | |
| DMP ® 30 | | 2.07 | 0.45 | 1.50 | |
| Total: | | 138.25 | 30.00 | 100.00 | 100.00 |

Table 46 provides the mass and % of total mass for the chemical components used to produce a Coating Formulation 19.

TABLE 46

Chemical components used to produce the Coating Formulation 19.

| Formulation 19 | GS-E9PDP15-11&12 | Mass (g) Theoretical | Mass (g) Practical | % Before curing | % After curing |
|---|---|---|---|---|---|
| BECKOPOCK EP 2384/57W | | 100.00 | 21.70 | 72.33 | 84.61 |
| PIP-C4-BIS-C3-NH2 [Formula XVII] | | 18.18 | 3.95 | 13.15 | 15.39 |
| Water | | 18.00 | 3.91 | 13.02 | |
| DMP ® 30 | | 2.07 | 0.45 | 1.50 | |
| Total: | | 138.25 | 30.00 | 100.00 | 100.00 |

Table 47 provides the mass and % of total mass for the chemical components used to produce a Coating Formulation 20. The ratio of the positive charge to the hydantoin in this formulation is 2.99:1.

TABLE 47

Chemical components used to produce the Coating Formulation 20.

| Formulation 20 | GS-E3PDP14-1, 2, 3 | Mass (g) Theoretical | Mass (g) Practical | % Before curing |
|---|---|---|---|---|
| BECKOPOCK EP 2384/57W | | 100.00 | 37.70 | 75.41 |
| PIP-C4-BIS-C3-NH2 (50%) [Formula XVII] | | 9.09 | 3.43 | 6.86 |
| Cationic DETA (50%) [Formula II] | | 3.54 | 1.33 | 2.67 |
| Water | | 18.00 | 6.79 | 13.57 |
| DMP ® 30 | | 1.99 | 0.75 | 1.50 |
| Total: | | 132.62 | 50.00 | 100.00 |

Table 48 provides the mass and % of total mass for the chemical components used to produce a Coating Formulation 21. The ratio of the positive charge to the hydantoin in this formulation is 3.99:1.

TABLE 48

Chemical components used to produce the Coating Formulation 21.

| Formulation 21 | GS-E11PDP13-1, 2, 3 | Mass (g) Theoretical | Mass (g) Practical | % Before curing |
|---|---|---|---|---|
| BECKOPOCK EP 2384/57W | | 100.00 | 35.55 | 71.11 |
| PIP-C4-BIS-C3-NH2 (50%) [Formula XVII] | | 10.00 | 3.56 | 7.11 |
| QAS-QPS (50%) [Formula IV] | | 10.53 | 3.74 | 7.49 |
| Water | | 18.00 | 6.40 | 12.80 |
| DMP ® 30 | | 2.10 | 0.75 | 1.49 |
| Total: | | 140.63 | 50.00 | 100.00 |

Table 49 provides the mass and % of total mass for the chemical components used to produce a Coating Formulation 22. The ratio of the positive charge to the hydantoin in this formulation is 9.99:1.

TABLE 49

Chemical components used to produce the Coating Formulation 22.

| Formulation 22 | GS-E11PDP3-1, 2, 3 | Mass (g) Theoretical | Mass (g) Practical | % Before curing |
|---|---|---|---|---|
| BECKOPOCK EP 2384/57W | | 100.00 | 35.47 | 70.94 |
| PIP-C4-BIS-C3-NH2 (20%) [Formula XVII] | | 4.00 | 1.42 | 2.84 |
| QAS-QPS (80%) [Formula IV] | | 16.85 | 5.98 | 11.95 |
| Water | | 18.00 | 6.38 | 12.77 |
| DMP ® 30 | | 2.12 | 0.75 | 1.50 |
| Total: | | 140.97 | 50.00 | 100.00 |

Table 50 provides the mass and % of total mass for the chemical components used to produce a Coating Formulation 23.

TABLE 50

Chemical components used to produce the Coating Formulation 23.

| Formulation 23 | GS-E9PDP15 | Mass (g) Theoretical | Mass (g) Practical | % Before curing |
|---|---|---|---|---|
| BECKOPOCK EP 2384/57W | | 100.00 | 36.17 | 72.33% |
| PIP-C4-BIS-C3-NH2 (50%) [Formula XVII] | | 18.18 | 6.58 | 13.15% |
| Water | | 18.00 | 6.51 | 13.02% |
| DMP ® 30 | | 2.07 | 0.75 | 1.50% |
| Total: | | 138.25 | 50.00 | 100.00% |

Table 50.1 provides the mass and % of total mass for the chemical components used to produce a Coating Formulation 24.

TABLE 50.1

Chemical components used to produce the Coating Formulation 24.

| Formulation 24 | E2A1P5-1&2 | Mass (g) Theoretical | Mass (g) Practical | % |
|---|---|---|---|---|
| BECKOPDX ® EP 2384W/57WA | | 75 | 34.42 | 50.04 |
| BECKOCURE EH 2260/41WA (60%) | | 100 | 27.37 | 39.79 |
| DI WATER | | 12 | 3.74 | 5.44 |
| ATH (40%) [Formula XVI] | | | 3.25 | 4.73 |
| Total: | | 187 | 68.8 | 100 |

Table 50.2 provides the mass and % of total mass for the chemical components used to produce a Coating Formulation 25.

TABLE 50.2

Chemical components used to produce the Coating Formulation 25.

| Formulation 25 | E2A1P5-3&4 | Mass (g) Theoretical | Mass (g) Practical | % |
|---|---|---|---|---|
| BECKOPDX ® EP 2384W/57WA | | 75 | 34.20 | 48.65 |
| BECKOCURE EH 2260/41WA (60%) | | 100 | 27.37 | 38.93 |
| DI WATER | | 12 | 3.74 | 5.32 |
| DOWANOL ® PPH | | | 1.74 | 2.48 |
| ATH (40%) [Formula XVI] | | | 3.25 | 4.62 |
| Total: | | 187 | 70.3 | 100 |

Table 50.3 provides the mass and % of total mass for the chemical components used to produce a Coating Formulation 26.

TABLE 50.3

Chemical components used to produce the Coating Formulation 26.

| Formulation 26 | NN-E2A1P6-1&2 | Theoretical | Practical | % |
|---|---|---|---|---|
| | | Mass (g) | | |
| BECKOPOX ® EP 2384W/57WA | | 75.00 | 25.57 | 51.14 |
| BECKOPOX ® EH 2260/41WA (50%) | | 50.00 | 17.05 | 34.09 |
| ATH (50%) [Formula XVI] | | 8.08 | 2.75 | 5.51 |
| DI WATER | | 12.12 | 4.13 | 8.26 |
| ADDITOL ® XW 390 | | 1.46 | 0.50 | 1.00 |
| Total: | | 146.66 | 50 | 100.00 |

Table 50.4 provides the mass and % of total mass for the chemical components used to produce a Coating Formulation 26.

TABLE 50.4

Chemical components used to produce the Coating Formulation 27.

| Formulation 27 | GS-E2NAPO | Theoretical | Practical | % |
|---|---|---|---|---|
| | | Mass (g) | | |
| BECKOPOX ® EP 2384W/57WA | | 75.00 | 12.66 | 42.22 |
| BECKOPOX ® EH 2260/41WA | | 100.00 | 16.89 | 56.29 |
| DMP ® 30 | | 2.66 | 0.45 | 1.50 |
| Total: | | 177.66 | 30.00 | 100.00 |

Table 50.5 provides the mass and % of total mass for the chemical components used to produce a Coating Formulation 26.

TABLE 50.5

Chemical components used to produce the Coating Formulation 28.

| Formulation 28 | GS-E9X2P27- 1, 2, 3 | Theoretical | Practical | % |
|---|---|---|---|---|
| | | Mass (g) | | |
| BECKOPOCK EP 2384/57W | | 100.00 | 18.29 | 60.97 |
| PIP-C4-P-C4-P-C4-BIS-C3-NH2 | | 43.55 | 7.97 | 26.56 |
| Water | | 18.00 | 3.29 | 10.97 |
| DMP ® 30 | | 2.46 | 0.45 | 1.50 |
| Total: | | 164.01 | 30.00 | 100.00 |

Table 50.6 provides the mass and % of total mass for the chemical components used to produce a Coating Formulation 26.

TABLE 50.6

Chemical components used to produce the Coating Formulation 29.

| Formulation 29 | GS-E10PDP13- 1, 2, 3 | Theoretical | Practical | % |
|---|---|---|---|---|
| | | Mass (g) | | |
| BECKOPOCK EP 2384/57W | | 100.00 | 37.27 | 74.53 |
| PIP-C4-BIS-C3-NH2 (50%) | | 10.00 | 3.73 | 7.45 |
| DETA-phosphate (50%) | | 4.17 | 1.55 | 3.10 |

TABLE 50.6-continued

Chemical components used to produce the Coating Formulation 29.

| Formulation 29 | GS-E10PDP13- 1, 2, 3 | Theoretical | Practical | % |
|---|---|---|---|---|
| | | Mass (g) | | |
| Water | | 18.00 | 6.71 | 13.42 |
| DMP 30 | | 2.00 | 0.75 | 1.49 |
| Total: | | 134.17 | 50.00 | 100.00 |

Table 51 shows the active surface chlorine-loading on modified surfaces that include the Coating Formulations 12 and 16.

TABLE 51

Chlorine Titration results 1 hr.

| Formulation | Sample ID | Active Chlorine | Standard Deviation |
|---|---|---|---|
| 12 | NN-E3A1P10-4 | 2.1322 | 0.3671 |
| 16 | NN-E4A1P7-2 | 2.5379 | 0.1926 |

Table 52 represents surfaces exposed to gram positive MRSA 40065 bacteria over various contact times.

TABLE 52

Biocidal activity results.

| Formulation | Sample ID | Log Reduction at Various Contact Times (min) MRSA Incolum 5.44-log | | | | |
|---|---|---|---|---|---|---|
| | | 1 | 5 | 10 | 30 | 60 |
| 13 | Unchlorinated E3A1P11-5&6 | / | / | / | / | 5.44 |
| 14 | Unchlorinated E3A1P8-1&2 | / | / | / | / | 5.44 |
| 15 | Unchlorinated E3A1P3-A&B | / | / | / | / | 5.44 |
| 13 | E3A1P11-5&6 | 1.53 | 5.44 | 5.44 | 5.44 | 5.44 |
| 14 | E3A1P8-1&2 | 0.86 | 2.15 | 5.44 | 5.44 | 5.44 |
| 15 | E3A1P3-A&B | 0.83 | 2.58 | 2.83 | 5.44 | 5.44 |

Table 53 The quantification of the positive charge on the surface using a benzoic acid dye analytical technique in 100 mL of water and DMSO.

TABLE 53

Quantification of the positive charge on the surface.

| Sample ID | UV Absorbance (n = 329 nm) | Concentration of dye (y = 23889x), mmol/L | Amount of Dye (mg) | The positivecharge (mg/cm2) |
|---|---|---|---|---|
| 50% Cationic Hardener + 50% Allnex Hardener | 0.722 | $0.030 \times 10^{-3}$ | $0.679 \times 10^{-3}$ | $0.679 \times 10^{-5}$ |
| 100% Cationic Hardener | 1.073 | $0.045 \times 10^{-3}$ | $1.018 \times 10^{-3}$ | $1.018 \times 10^{-5}$ |

Table 53.1 The quantification of the positive charge on the surface using a benzoic acid dye analytical technique in 200 mL of water and DMSO.

TABLE 53.1

Quantification of the positive charge on the surface.

| Sample ID | UV Absorbance (n = 329 nm) | Concentration of dye (y = 23839x), mmol/L | Amount of Dye (mg) | Positive charge (mg/cm2) |
|---|---|---|---|---|
| 50% Cationic Hardener + 50% Allnex Hardener | 0.763 | $0.032 \times 10^{-3}$ | $1.448 \times 10^{-3}$ | $1.448 \times 10^{-5}$ |
| 100% Cationic Hardener | 1.502 | $0.063 \times 10^{-3}$ | $2.850 \times 10^{-3}$ | $2.850 \times 10^{-5}$ |

Table 55 provides the chlorine titration results. Coated samples are chlorinated at 200 ppm and shaken for various time increments at a ratio of 2:1 cationic center to NH.

TABLE 55

Chlorine Titration results.

| Formulation | Sample ID | Active Chlorine | STD |
|---|---|---|---|
| 17 | E9PDP15-6 (5 minute) | 5.6016 | 1.9052 |
| 17 | E9PDP15-6 (10 minute) | 9.1650 | 2.3830 |
| 17 | E9PDP15-6 (15 minute) | 7.5130 | 0.6350 |

Table 56 provides the chlorine titration results. Coated samples are chlorinated at 100 ppm and shaken for various time increments at a ratio of 2:1 cationic center to NH.

TABLE 56

Chlorine Titration results.

| Formulation | Sample ID | Active Chlorine | STD |
|---|---|---|---|
| 18 | E9PDP 15-9 (10 minute) | 6.11 | 0.23 |
| 17 | E9PDP 15-5 (60 minute) | 5.9961 | 1.0189 |

Table 57 provides the chlorine titration results. Coated samples are chlorinated at 200 ppm and shaken for 10 min. The ratio of the positive charge to piperidinol in Coating Formulation 22 is 10.0:1 and Coating Formulation 28 is 4:1.

TABLE 57

Chlorine Titration results.

| Formulation | Sample ID | Active Chlorine | STD |
|---|---|---|---|
| 27 | E11NAP0 | −0.52 | 0.90 |
| 22 | E11PDP3 | 0.09 | 0.25 |
| 28 | E9X2P27 | 9.93 | 1.34 |

Table 58 The quantification of the positive charge on the surface using a benzoic acid dye analytical technique, ratio of the positive charge to piperidinol in Coating Formulations 23, 17 and 18 is 2:1.

TABLE 58

Quantification of the positive charge on the surface.

| Formulation | Sample ID | Charge Density (N+/cm2) | STD |
|---|---|---|---|
| 23 | E9PDP15-3 | 1.54E+16 | 3.55E+15 |
| 17 | E9PDP15-5 (DMP 30) | 1.69E+16 | 2.82E+15 |
| 18 | E9PDP15-9 (DMP 30) | 6.86E+15 | 6.51E+13 |
| 23 | E9PDP15-7 (Additol xw 390) | 1.60E+16 | 2.84E+14 |

Table 59 The quantification of the positive charge on the surface using a benzoic acid dye analytical technique, the ratio of the positive charge to piperidinol in these coating formulations are shown in round parenthesis.

TABLE 59

Quantification of the positive charge on the surface.

| Formulation | Sample (the positive charge:piperidinol) | Charge Density (N+/cm2) | STD |
|---|---|---|---|
| 20 | E3PDP14-1 (2.99:1) | 8.44784E+15 | 6.19E+14 |
| 29 | E10PDP13-3 (2.33:1) | 4.16135E+15 | 2.21E+14 |
| 21 | E11PDP13-2 (3.99:1) | 6.24202E+15 | 7.30E+14 |
| 22 | E11PDP3 (9.99 :1) | 1.62004E+15 | 1.06E+14 |
| 28 | E9X2PDP27 (4:1) | 9.55832E+15 | 3.14E+15 |

Table 60 represents surfaces exposed to *E. coli* bacteria over various contact times.

TABLE 60

Biocidal activity results.

| | | Log Reduction at Various Contact Times (min) *E. coli* Inoculum 5.42-log | | |
|---|---|---|---|---|
| Formulation | Sample ID | 10 | 30 | 60 |
| 27 | Control E2NAP0 | / | / | 0.67 |
| 23 | Unchlorinated E9PDP15-13 | 1.02 | 5.42 | 5.42 |
| 21 | Unchlorinated E11PDP13 -1&2 | −0.43 | 5.42 | 5.42 |
| 23 | Chlorinated E9PDP15-13 | 5.42 | 5.42 | 5.42 |
| 21 | Chlorinated E11PDP13 -1&2 | 1.24 | 5.42 | 5.42 |

Table 61 represents surfaces exposed to *E. coli* bacteria over various contact times.

TABLE 61

Biocidal activity results in de-ionized water.

| Formulation 23 | Log Reduction at Various Contact Times (min) *E. coli* Incolum | | |
|---|---|---|---|
| Sample ID E9PDP15 | 10 | 30 | 60 |
| Unchlorinated | 1.02 | 5.42 | 5.42 |
| Chlorinated | 5.42 | 5.42 | 5.42 |

Table 62 represents surfaces exposed to *E. coli* bacteria over various contact times.

TABLE 62

Biocidal activity results in de-ionized water.

| Formulation 21 | Log Reduction at Various Contact Times (min) E. coli Incolum | | |
|---|---|---|---|
| Sample ID E11PDP13 | 10 | 30 | 60 |
| Unchlorinated | −0.43 | 5.42 | 5.42 |
| Chlorinated | 1.24 | 5.42 | 5.42 |

Table 63 provides the chlorine titration results. Coated samples are chlorinated at 100 ppm and shaken for one hour.

TABLE 63

Chlorine Titration results after 1 hour.

| Formulation | Sample ID | Active Chlorine | STD |
|---|---|---|---|
| 25 | E2A1P5-3 | 0.1932 | 0.2652 |
| 10 | E3A1P7-1 | 1.8744 | 1.1234 |

TABLE 63-continued

Chlorine Titration results after 1 hour.

| Formulation | Sample ID | Active Chlorine | STD |
|---|---|---|---|
| 24 | E1A1P5-1 | 0.7988 | 0.4043 |
| 24 | E1A1P5-2 | 0.6264 | 0.3963 |

Table 64 provides the chlorine titration results. Coated samples are chlorinated at 100 ppm and shaken for one hour.

TABLE 64

Chlorine Titration results after 1 hour.

| Formulation | Sample ID | Active Chlorine | Standard Deviation |
|---|---|---|---|
| 12 | NN-E3A1P11-4 | 2.1322 | 0.3671 |
| 26 | NN-E2A1P6-1 | 0.8243 | 0.1028 |
| 10 | NN-E3A1P7-2 | 2.5379 | 0.1926 |

Table 65 shows the calculated ration of positive N atoms to molecules with N—H binding sites on N-halamine precursor bearing groups in the Coating Formulations provided.

TABLE 65

Summary of calculated ratios of cationic charges to N—H binding sites.

| Formulation | Cationic DETA(g) | ATH (g) | Cationice DETA molecule | ATH molecules | N+ charges: NH |
|---|---|---|---|---|---|
| E1A1P7-1&2 | 2.52 | 5.17 | 7.15503E+21 | 9.64053E+21 | 1.742182018 |
| NN-E3A1P11-1&2 | 0.48 | 5.88 | 1.36286E+21 | 1.09645E+22 | 1.124298058 |
| NN-E3A1P11-3&4 | 0.43 | 5.29 | 1.2209E+21 | 9.86429E+21 | 1.12376938 |
| NN-E3A1P11-5&6 | 0.48 | 5.82 | 1.36286E+21 | 1.08526E+22 | 1.125579481 |
| NN-E3A1P8-1&2 | 1.29 | 3.93 | 3.66269E+21 | 7.32829E+21 | 1.49980154 |
| NN-E3A1P3-1&2 | 2.24 | 1.71 | 6.36002E+21 | 3.18865E+21 | 2.994584034 |
| NN-E4A1P7-1&2 | 0.54 | 3.29 | 1.53322E+21 | 6.13488E+21 | 1.249918435 |

Table 66 shows the calculated ration of positive N atoms to molecules with N—H binding sites on N-halamine precursor bearing groups in the Coating Formulations provided.

TABLE 66

Summary of calculated ratios of cationic charges to N-H binding sites.

| Formulation | Cationic (g) | PIP-C4-BIS-C3-NH2 (g) | Cationice DETA molecule | PIP molecules | N + charges; NH | Cationic analogue |
|---|---|---|---|---|---|---|
| GS-E3PDP14-1,2,3 | 1.33 | 3.43 | 3.77626E+21 | 3.78729E+21 | 2.997089771 | DETA |
| GS-E10PDP13-1,2,3 | 1.55 | 3.73 | 1.36969E+21 | 4.11854E+21 | 2.332566491 | DETA PO$_4$ |
| GS-E11PDP13-1,2,3 | 3.74 | 3.56 | 1.96086E+21 | 3.93083E+21 | 3.995370565 | QAS-QPS |
| G5-E11PDP3-1,2,3 | 5.98 | 1.42 | 3.13529E+21 | 1.56791E+21 | 9.998615065 | QAS-QPS |

Accordingly, based on the foregoing, an article comprising a compound as described herein is contemplated. Monomers or precursors and polymers of the monomers, precursors and compounds are also contemplated, and articles prepared from monomers, precursors and polymers thereof are also contemplated.

Methods of inactivating a microorganism or of inhibiting microbial growth are also contemplated. A method comprising contacting the microorganism or a surface on which a microorganism resides with a compound, monomer of a compound, or an article coated with a compound or coating formulation as described herein is contemplated. The microorganism can be a bacteria, a virus or a fungus.

Other embodiments of the present disclosure relate to a method whereby a compound or an article comprising a compound described herein is exposed to a source of chlorine, bromine or iodine. In another embodiment, a method is contemplated, wherein the method comprises providing a compound or an article comprising a compound described herein and exposing the compound or article comprising the compound to a source of chlorine, bromine or iodine. The method finds use in rendering a surface aseptic or essentially aseptic. The method also finds use in recharging biocidal activity of a compound or article coated with a compound or coating formulation as described herein. Further embodiments of the present disclosure relate to methods of modulating the ratio of positive charge to the number of N—H binding sites that are connected upon a modified surface.

The invention claimed is:

1. A formulation comprising:
   a) a plurality of cationic centers (PCC);
   b) a plurality of N-halamine precursors (PNHP) at least a portion of which are incorporated in a backbone of a polymer, and
   c) a base polymer, wherein the base polymer is a homopolymer or copolymer of: acrylic acid, acrylonitrile, acrylamide, vinyl acetate, methyl acrylate, ethyl acrylate, butyl acrylate, methyl methacrylate, ethyl methacrylate, butyl methacrylate, hexyl methacrylate, hydroxyethyl methacrylate, glycidyl methacrylate, chloroethyl vinyl ether, ethylhexyl acrylate, styrene, vinyl choloride, vinylidene chloride, bisphenol A diglycidyl ether, bis[4-(glycidyloxy)phenyl]methane, 1,3-butadiene diepoxide, 1,4-butanediol diglycidyl, 1,4-butanediol diglycidyl ether, butyl glycidyl ether, tert-butyl glycidyl ether, 4-chlorophenyl glycidyl ether, 1,4-cyclohexanedimethanol diglycidyl ether, cyclohexene, cyclopentene oxide, dicyclopentadiene dioxide, 1,2,5,6-diepoxycyclooctane, 1,2,7,8-diepoxyoctane, diglycidyl 1,2-cyclohexanedicarboxylate, N,N-diglycidyl-4-glycidyloxyaniline, 1,2-epoxybutane, cis-2,3-epoxybutane, 3,4-epoxy-1-butene, 3,4-epoxycyclohexylmethyl, 3,4-epoxycyclohexanecarboxylate, 1,2-epoxydodecane, 1,2-epoxyhexadecane, 1,2-epoxyhexane, 1,2-epoxy-5-hexene, 1,2-epoxy-2-methylpropane, exo-2,3-epoxynorbornane, 1,2-epoxyoctane, 1,2-epoxypentane, 1,2-epoxy-3-phenoxypropane, 1,2-epoxy-3-phenoxypropane, (2,3-epoxypropyl)benzene, N-(2,3-epoxypropyl)phthalimide, 2-epoxytetradecane, exo-3,6-epoxy-1,2,3,6-tetrahydrophthalic anhydride, 3,4-epoxytetrahydrothiophene-1,1-dioxide, 2-ethylhexyl glycidyl ether, furfuryl glycidyl ether, glycerol diglycidyl ether, glycidyl hexadecyl ether, glycidyl isopropyl ether, glycidyl 4-methoxyphenyl ether, glycidyl 2-methylphenyl ether, glycidyl 2,2,3,3,4,4,5,5-octafluoropentyl ether, glycidyl 2,2,3,3-tetrafluoropropyl ether, (2,2,3,3,4,4,5,5,6,6,7,7,8,8,9,9,9-heptadecafluorononyl)oxirane, isophorone oxide, 4,4'-methylenebis (N,N-diglycidylaniline), methyl trans-3-(4-methoxyphenyl)glycidate, 2-methyl-2-vinyloxirane, neopentyl glycol diglycidyl ether, octyl/decyl glycidyl ether, α-pinene oxide, propylene oxide, propylene oxide, resorcinol diglycidyl ether, cis-stilbene oxide, styrene oxide, tetracyanoethylene oxide, tetraphenylolethane glycidyl ether, tris(2,3-epoxypropyl) isocyanurate, tris (4-hydroxyphenyl)methane triglycidyl ether, a polyetheramine monomer, a jeffamine, a polyamide monomer, an amidoamine, ethyleneamines, diethylenetriamine, triethylenetetraamine, tetraethylenepentamine, N-aminoethylpiperazine, bis-(p-aminocyclohexyl) methane, diaminocyclohexane, bis-dimethyldiaminocyclohexyl)methane, methylene dianiline, m-phenylene diamine, diaminophenyl sulfone, methylene diphenyl diisocyanate, toluene diisocyanate, hexamethylene diisocyanate, isophorone diisocyanate, 1,3-diisocyanatobenzene, tert-butyl N,N-bis(2-hydroxyethyl)carbamate, hexahydroxy-1,4-naphthalenedione, a hydrogenated starch hydrolysate, a hydroxyl-terminated butadiene, glycerin, pentaerythritol, ethylene glycol, sucrose, ethylene oxide triol, propylene oxide triol, sorbitol, caprolactone, pentadecalactone, dodecanlactone, undecanlactone, ethyldodecanoate, hexylnonanoate, hexanehexanoic, hexanedodecanoic, butylene succinate, or a combination thereof, and wherein a ratio of the plurality of cationic centers present in the formulation to the plurality of N-halamine precursors present in the formulation (PCC: PNHP) is greater than one.

2. The formulation of claim 1, wherein at least a portion of the PCC and at least a portion of the PNHP are functional groups of a first monomer.

3. The formulation of claim 2, further comprising a second monomer which comprises one or more further cationic centers.

4. The formulation of claim 3, further comprising a third monomer which comprises one or more further N-halamine precursors.

5. The formulation of claim 1, wherein at least a portion of the PCC are functional groups of a first monomer and at least a portion of the PNHP are functional groups of a second monomer.

6. The formulation of claim 5, further comprising a third monomer which comprises one or more further cationic centers.

7. The formulation of claim 6, further comprising a fourth monomer which comprises one or more further N-halamine precursors.

* * * * *